US012760725B2

(12) United States Patent
Gordon et al.

(10) Patent No.: US 12,760,725 B2
(45) Date of Patent: Oct. 13, 2026

(54) FLUID ISOLATING PERISTALTIC PUMP

(71) Applicant: ReelReactor, Inc., Encinitas, CA (US)

(72) Inventors: Michael Sean Gordon, Encinitas, CA (US); Eric Andrew Warner, Oceanside, CA (US)

(73) Assignee: ReelReactor, Inc., Star, ID (US)

( * ) Notice: Subject to any disclaimer, the term of this patent is extended or adjusted under 35 U.S.C. 154(b) by 231 days.

(21) Appl. No.: 18/621,711

(22) Filed: Mar. 29, 2024

(65) Prior Publication Data

US 2024/0328408 A1 Oct. 3, 2024

Related U.S. Application Data

(60) Provisional application No. 63/456,439, filed on Mar. 31, 2023.

(51) Int. Cl.
*F04B 43/12* (2006.01)

(52) U.S. Cl.
CPC ...... *F04B 43/1261* (2013.01); *F04B 43/1276* (2013.01); *B01J 2219/00355* (2013.01)

(58) Field of Classification Search
CPC .. F04B 43/12; F04B 43/1276; F04B 43/1261; B01J 4/00; B01J 2219/00355
See application file for complete search history.

(56) References Cited

U.S. PATENT DOCUMENTS 2,696,173 A * 12/1954 Jensen ................ F04B 43/1253 417/477.6
3,116,697 A * 1/1964 Bilichniansky ..... F04B 43/1223 417/477.7
3,740,173 A * 6/1973 Natelson ............. F04B 43/1284 101/365
4,604,038 A * 8/1986 Belew ................. F04B 43/1292 417/477.6
10,302,076 B2 5/2019 Hays et al.
11,549,503 B2 * 1/2023 Gordon ............... F04B 43/1261
11,732,003 B2 * 8/2023 Tuccelli ................. B01D 15/24 435/237
2020/0172568 A1 * 6/2020 Tuccelli ................. B01D 15/24
2021/0062801 A1 * 3/2021 Gordon ............... F04B 43/1284

FOREIGN PATENT DOCUMENTS

GB 2128262 A 4/1984

OTHER PUBLICATIONS

Search Report for European Application No. 24167924.0, Dated Aug. 1, 2024, 8 pages.

* cited by examiner

*Primary Examiner* — Nathan C Zollinger
(74) *Attorney, Agent, or Firm* — Lee & Hayes, P.C.

(57) ABSTRACT

A reactor includes a drum motor, and a roller assembly including a roller. The reactor further includes: a roller motor mechanically coupled to the roller assembly, a ring gear mechanically coupled to the roller motor, and a motor balancing system to preload tension into the drum motor belt to synchronize the drum motor and the roller motor. The reactor system further includes a consumable that is insertable into the reactor. The motor balancing system includes a drum motor belt coupled to the drum motor an arm coupled to the drum motor belt, and a spring coupled to the arm. The spring applies a tension force to the drum motor belt.

20 Claims, 30 Drawing Sheets

| Ingredient | % by Volume |
|---|---|
| Bulk Reagent | 46% |
| Input Reagent Vessel 1 | 28% |
| Input Reagent Vessel 2 | 17% |
| Input Reagent Vessel 3 | 8% |
| Input Reagent Vessel 4 | 1% |

| Temperature in Celsius | 37C |
|---|---|

| Residence Time | |
|---|---|
| Days | 0 |
| Hours | 4 |
| Minutes | 13 |
| Seconds | 30 |

FIG. 14

FLUID ISOLATING PERISTALTIC PUMP

RELATED APPLICATIONS

This application claims the benefit of priority of provisional U.S. Application No. 63/456,439, filed Mar. 31, 2023, which is incorporated herein by reference in its entirety.

TECHNICAL FIELD

The present disclosure relates generally to the manufacture of biological and non-biological materials or fluids. Specifically, the present disclosure provides for a fluid isolating peristaltic pump and processes for isolating a material or fluid for a predetermined amount of time in a continuous flow.

BACKGROUND

For many reasons, chemical compounds, reagents, antibodies, living and non-living biologicals, and various other types of liquids used in the manufacturing of chemicals, compounds, pharmaceuticals and cell and gene therapies may be produced. These chemicals, compounds, pharmaceuticals and cell and gene therapies may be manufactured in a "batch" method, meaning that a predetermined volume or "batch" is manufactured at a time. To ensure quality and efficacy of the product, each batch may undergo its own quality control (QC) testing to verify purity, potency, and sterility. Batch processing, however, inherently has limitations on batch size or batch volume and uses significantly more resources when compared to a continuous manufacturing method. Some processes, however, are not ideal candidates for continuous manufacturing. There is currently a technological gap that is preventing many complex processes from shifting towards continuous manufacturing. This issue may be perpetuated as quality, scalability, and cost are considered.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 14 illustrates example parameters a user may enter into a computing device of a reactor system, according to an example of the principles described herein.

DESCRIPTION OF EXAMPLE EMBODIMENTS

Overview

Figure 1:
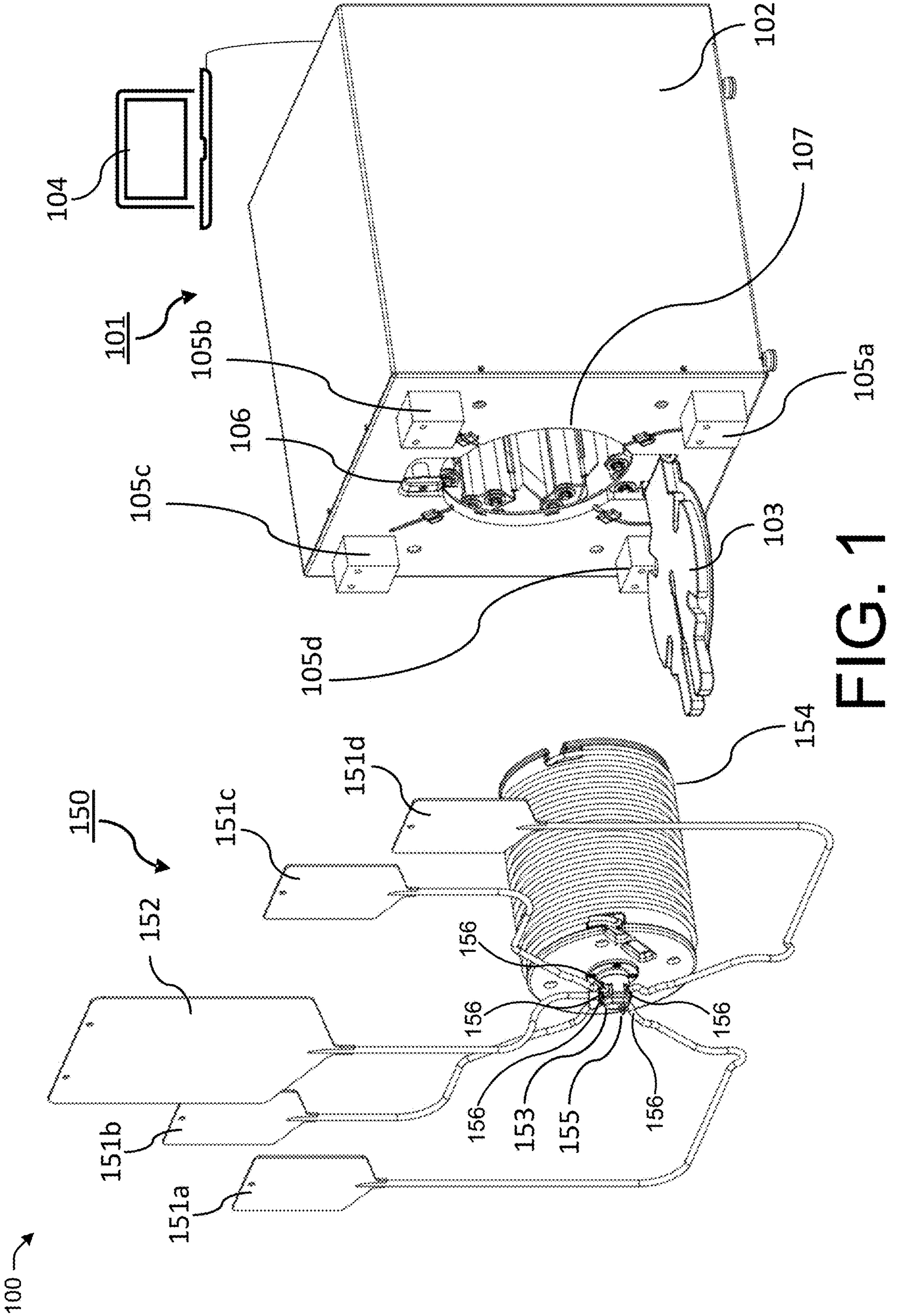
FIG. 1 illustrates an isometric view of a reactor system with an aligned but uninstalled consumable, according to an example of the principles described herein.

This disclosure describes methods, systems, and devices directed to a fluid isolating peristaltic pump for use in isolating a material or fluid for a predetermined amount of time in a continuous flow. U.S. Patent Application Publication No. 2021/0062801 A1, which is incorporated herein by reference, describes a fluid isolating peristaltic pump technology for performing continuous chemical or biological reactions of liquids and other materials. The examples described herein improve performance within the fluid isolating peristaltic pump, as well as increase usability and manufacturability of chemicals, compounds, pharmaceuticals, cell and gene therapies, and other organic and non-organic fluids and materials that may be produced via the fluid isolating peristaltic pump. Further, the fluid isolating peristaltic pump and its associated elements described herein provide an improved and superior fluid isolating peristaltic pump system and single-use consumables used in conjunction with the fluid isolating peristaltic pump.

Many of the fluids or products used in the manufacturing of cell and gene therapies, for example, may be limited to batch manufacturing because they often require complex incubations as part of their workflows. During the production process, some ingredients may be mixed and then allowed to "incubate" for a specified period of time before further ingredient(s) may be added. In some cases, multiple incubations may be required. In a batch manufacturing environment, this is easily achieved.

An alternative to batch processing is "continuous" processing where a manufacturing system outputs a product on a consistent basis. Continuous processing removes some of the costs and time constraints found in batch processing. It is also scalable to theoretically achieve any desired throughput. In contrast to batch processing, which may require each batch to undergo strict quality control testing, continuous processing may be less resource dependent because quality tests and assays may be performed on a schedule.

In the bioprocessing industry, a standard method of continuous processing involves pumping fluid through sterile tube sets that may be referred to as consumable sets. Peristaltic pumps are often used to transfer the fluid within these sterile tube sets. The benefit of peristaltic pumps is that they apply pressure external to the tubing to transfer fluid within it, effectively maintaining the sterility of the functionally-closed system. This design may be effective at transferring fluids within tubing, such as silicone, polyvinyl chloride (PVC), thermoplastic elastomers (TPE), or other types of tubing.

However, it may be difficult to achieve proper manufacturing of certain products using continuous flow processing. For example, it may be difficult to achieve proper incubation of fluids when operating in a continuous flow.

Examples described herein provide a reactor system that may include a reactor. The reactor may include a drum motor, and a roller assembly including a roller. The reactor may further include a roller motor mechanically coupled to the roller assembly, a ring gear mechanically coupled to the roller motor, and a motor balancing system to preload tension into the drum motor belt to synchronize the drum motor and the roller motor. The reactor system may further include a consumable that is insertable into the reactor. The motor balancing system may include a drum motor belt coupled to the drum motor, an arm coupled to the drum motor belt, and a spring coupled to the arm, the spring applying a tension force to the drum motor belt.

The reactor system may further include a consumable interface coupled to a drum motor belt and driven by the drum motor. The consumable may include an end plate selectively engageable with the consumable interface such that when engaged, the consumable rotates as the consumable interface rotates.

The roller assembly may include a body, a shaft coupled to the body along a first longitudinal axis, a gear mechanically coupled to the shaft and the ring gear, and a roller coupled to the body along a second longitudinal axis. The roller assembly may further include a roller belt coupled between the shaft and the roller to transfer rotational force from the shaft to the roller, and an actuator coupled to the body along a third longitudinal axis, the actuator being configured to selectively position the roller against the consumable.

The consumable may include a first end plate, a second end plate coupled to the first end plate via a tensioner, and a rotary seal coupled to the first end plate. The rotary seal may include a first subassembly, a second subassembly rotatable with respect to the first subassembly, an input lumen defined in the first subassembly, and an output lumen defined in the first subassembly. The first subassembly and the second subassembly are hermetically sealed from an environment exterior to the consumable.

The consumable further may include an unreacted tubing fluidically coupled to the input lumen of the rotary seal, a first fitting fluidically coupled to the unreacted tubing, a main tubing fluidically coupled to the first fitting, a second fitting fluidically coupled to the main tubing, and a reacted tubing fluidically coupled to the second fitting and the output lumen of the rotary seal. The consumable further may include an input reagent vessel fluidically coupled to the input lumen, and a bulk reagent vessel fluidically coupled to the input lumen. The reactor system may further include a computing device communicatively coupled to control and monitor the reactor.

Examples described herein also provide a fluid isolating peristaltic pump. The fluid isolating peristaltic pump may include a drum motor, and a roller assembly including a roller, a roller motor mechanically coupled to the roller assembly, and a ring gear mechanically coupled to the roller motor.

The fluid isolating peristaltic pump may further include a motor balancing system to preload tension into a drum motor belt to synchronize the drum motor and the roller motor. The motor balancing system may include the drum motor belt coupled to the drum motor, an arm coupled to the drum motor belt, and a spring coupled to the arm, the spring applying a tension force to the drum motor belt.

The fluid isolating peristaltic pump may further include a consumable interface coupled to the drum motor belt and driven by the drum motor to mechanically interface with an end plate of a consumable to rotate the consumable as the consumable interface rotates. The roller assembly may include a body, a shaft coupled to the body along a first longitudinal axis, a gear mechanically coupled to the shaft and the ring gear, a roller coupled to the body along a second longitudinal axis, a roller belt coupled between the shaft and the roller to transfer rotational force from the shaft to the roller, and an actuator coupled to the body along a third longitudinal axis, the actuator being configured to selectively position the roller against a consumable. The roller assembly may include a plurality of roller assemblies and a plurality of actuators, wherein the plurality of actuators of the plurality of roller assemblies are individually actuatable based at least in part on a protocol. The actuator may include a first actuator coupled to a first end of the body and a second actuator coupled to a second end of the body. The roller assembly may further include a connecting rod connecting the first actuator and the second actuator. The actuator may include pneumatic cylinders or hydraulic cylinders.

The fluid isolating peristaltic pump may further include a pump to transfer reactants, which are within a reagent vessel, into a consumable. The pump includes one or more of a peristaltic pump, a syringe pump, a gear pump, or a diaphragm pump.

Examples described herein also provide a consumable for a fluid isolating peristaltic pump. The consumable may include a first end plate, a second end plate coupled to the first end plate via a tensioner, and a rotary seal coupled to the first end plate. The rotary seal may include a first subassembly, a second subassembly rotatable with respect to the first subassembly, an input lumen defined in the first subassembly, and an output lumen defined in the first subassembly. The first subassembly and the second subassembly are hermetically sealed from an environment exterior to the consumable.

The consumable may further include an unreacted tubing fluidically coupled to the input lumen of the rotary seal, a first fitting fluidically coupled to the unreacted tubing, a main tubing fluidically coupled to the first fitting, a second fitting fluidically coupled to the main tubing, and a reacted tubing fluidically coupled to the second fitting and the output lumen of the rotary seal. The consumable may further include an input reagent vessel fluidically coupled to the input lumen, and a bulk reagent vessel fluidically coupled to the input lumen.

Additionally, the techniques described in this disclosure may be performed as a method and/or by a system having non-transitory computer-readable media storing computer-executable instructions that, when executed by one or more processors, performs the techniques described above.

Example Embodiments

This disclosure describes a fluid isolating peristaltic pump including a reactor and a consumable for use within the reactor. The reactor includes roller assemblies that assist in the creation of isolated volumes within a processing tubing wrapped around an outside of the consumable as the consumable is rotated within the reactor via a drum motor. The consumable includes a rotary seal that allows for the consumable to be rotated within the reactor by the roller assemblies while still providing reactants to the tubing wrapped around the outside of the consumable.

Certain implementations and embodiments of the disclosure will now be described more fully below with reference to the accompanying figures, in which various aspects are depicted. However, the various aspects may be implemented in many different forms and should not be construed as limited to the implementations set forth herein. The disclosure encompasses variations of the embodiments, as described herein. Like numbers refer to like elements throughout.

FIG. 1 illustrates an isometric view of a reactor system 100 with an aligned but uninstalled consumable 150, according to an example of the principles described herein. As depicted in FIG. 1, the present disclosure includes a two-part system including a reactor 101 and a consumable 150. The reactor 101 of the reactor system 100 may be designed to receive and operate the consumable 150.

External components of the reactor 101 may include an enclosure 102, the reactor door 103, the computing device 104, pumps 105*a*, 105*b*, 105*c*, 105*d* (collectively referred to herein as pump(s) 105 unless specifically addressed otherwise), a door latch 106, and a reactor opening 107. The enclosure 102 provides a physical barrier between the internal components of the reactor 101 and all that is external to the reactor 101. In addition to maintaining cleanliness of the reactor 101, the enclosure 102 may also allow for control over temperature and light within the enclosure 102 because some applications of the reactor system 100 may include ingredients that are temperature and/or light sensitive. Therefore, the enclosure 102 may serve to regulate the temperature and/or light exposure within the reactor 101. The enclosure 102 also protects the user from any mechanical or electrical hazards that may be present before, during, or after operation.

Further, in FIG. 1, the enclosure 102 may also serve as a chassis on which system hardware may be attached, fixed, or mounted, such as in the case of the pumps 105*a*, 105*b*, 105*c*, 105*d* (collectively referred to herein as pump(s) 105 unless specifically addressed otherwise). The enclosure 102 may be made from any combination of metal, plastic, glass, composite, or similar. The walls of the enclosure 102 may be thermally insulated to allow for the internal volume of reactor 101 to be temperature controlled. The enclosure 102 may have openings or access panels to allow for system maintenance and bulkhead fittings for utilities such as power, data, and pressurized gas.

The enclosure 102 may include the reactor door 103 which provides access to the internal portions of the reactor 101 and allows for the installation and removal of the consumable 150. The reactor door 103 may be made from any combination of metal, plastic, glass, composite, or other material. The reactor door 103 may be thermally insulated to allow for the internal volume of reactor 101 to be temperature controlled. The reactor door 103 may have cutouts to allow for tubing of the consumable 150 to enter and exit the reactor 101. Further, in one embodiment, the reactor door 103 may also have a transparent window to allow a system operator to view the internals of reactor 101 during operation.

As depicted in FIG. 1, the reactor door 103 may be attached to the enclosure 102 via a mechanical hinge. In one embodiment, this hinge may be located on the bottom edge of the reactor door 103. In one embodiment, the hinge may be located on a vertical or top edge of the reactor door 103. The shape of the reactor door 103 may be square, rectangular, round, or any other suitable shape. Sensors, such as those used to measure volumetric flow rates or the presence or absence of liquid, may be integrated into the reactor door 103. In one embodiment, the reactor door 103 may be manually operated by the user. In other embodiments, the reactor door 103 may be automated. The reactor door 103 may have physical features that assist with the axial alignment of the consumable 150 with reactor opening 107.

The reactor door 103 may be secured in a closed position by a door latch 106. The door latch 106 may be a mechanical, electrical, and/or magnetic latching device. In one embodiment, the reactor door 103 may be integrated into the consumable 150.

The reactor system 100 may include the computing device 104 which is used to control and monitor the reactor 101. Some examples of actions that may be performed using the computing device 104 include creating protocols, editing protocols, running protocols, monitoring system performance during operation, running diagnostics, performing system updates, enabling data communications, and creating/exporting run logs. In one embodiment, the computing device 104 may include a touch screen device that is integrated into the enclosure 102. In another embodiment, the computing device 104 may be an external laptop or tablet that is not integrated into the enclosure 102. The computing device 104 may also be used to integrate the reactor system 100 into a broader automated systems or distributed control systems, such as, for example, a DeltaV™ distributed control system developed and distributed by Emerson Electric Co. The computing device 104 may also be used to control multiple reactors 101 that are unique and/or are connected in series or parallel.

As depicted in FIG. 1, the reactor 101 may include pumps 105 which are used to transfer liquid ingredients, also known as "reactants," into the consumable 150. In the example depicted in FIG. 1, four (4) pumps are used. Other embodiments may require as few as one (1) pump 105, while other embodiments may require as many as eighteen (18) pumps or more. The pumps 105 may be integrated into the enclosure 102 as depicted in FIG. 1 or exist external or the enclosure 102.

In one embodiment, each pump 105 may be of the same size and of the same pumping technology. In other embodiments, combinations of pump sizes and technologies may be used. For example, an embodiment with four (4) pumps 105 may include one (1) peristaltic pump, one (1) syringe pump, one (1) gear pump, and one (1) diaphragm pump. The quantity and types of pumps used may depend at least in part on the number of input reactants, their individual flow rates, and their unique material properties, such as viscosity, temperature, and vulnerability to shear forces, among other material properties. Each pump 105 may be controlled by the software, firmware, and/or hardware of the reactor 101.

In some embodiments, it may be beneficial to mount pumps 105 into a manifold. In one embodiment, this manifold may be integrated into the enclosure 102 and may not be removable. In another embodiment, this manifold may be separate from the enclosure 102 and may either be secured, or positioned adjacent to, the enclosure 102. In some embodiments, multiple pump manifolds may be used. For example, there may be justification to have a pump manifold on both sides of the reactor 101. Each manifold may include sensors to assist the reactor 101 with fluid management. These sensors may include liquid detection sensors, flow rate sensors, turbidity sensors, and/or other types of sensors used to detect liquid within the manifold. Liquid detection sensors, also known as bubble sensors, may be positioned upstream or downstream of each pump in the manifold. These liquid detection sensors may be used to fluidically prime the consumable 150, detect when bubbles are present, and/or detect when an input reagent vessel is empty. Flow sensors may be installed upstream or downstream of each pump 105 to support the reactor 101 with balancing flow rates. Turbidity sensors may also be used to monitor the fluid within the inlet or outlet of the consumable 150. Unexpected changes in turbidity may suggest a system error. Each pump manifold may also include pinch valves to compress individual tubes of the consumable 150. These pinch valves may be electrically or pneumatically operated. The consumable 150 may include input reagent vessels 151*a*, 151*b*, 151*c*, 151*d* (collectively referred to herein as input reagent vessel(s) 151 unless specifically addressed otherwise) (see FIGS. 1 and 15), bulk reagent vessels 152, a rotary seal 153, a drum assembly 154, a plurality of inlets 156 into the rotary seal 153 and from the input reagent vessels 151 and bulk reagent vessels 152, and an outlet 155.

Each input reagent vessel 151 may contain a unique liquid ingredient, also referred to as a reactant. The input reagent vessels 151 may be constructed from a variety of materials including plastic, glass, metal, or composite. The input reagent vessels 151 may be flexible or rigid and may be sized appropriately to provide sufficient fluid volumes during operation of the reactor system 100. The form factors of the input reagent vessels 151 may include, for example, bags, bottles, tanks, and drums. An input reagent vessel 151 may alternatively be a cell culture vessel, such as a rocker bag, stirred-tank bioreactor, or static cell culture vessel. Each input reagent vessel 151 may contain liquid, gas, solids, or any mixture thereof. Liquids may also include particles such as cells, viruses, or small molecules. Each input reagent vessel 151 may be connected to the rotary seal 153 by means of a tube.

As depicted in FIG. 1, the input reagent vessels 151 may be manufactured as part of the consumable 150. In other embodiments, the input reagent vessels 151 may be connected to the consumable 150 by means of Luer fittings, barb fittings, couplers, aseptic connectors, or by means of a sterile tube welder associated with the inlets 156. The fluid within each input reagent vessel 151 may be transferred into the rotary seal 153 by means of a pump 105. In the example depicted in FIG. 1, four (4) input reagent vessels are used. In other embodiments, between one (1) and eighteen (18) input reagent vessels 151 may be used.

The bulk reagent vessel 152 included in the reactor system 100 may have identical characteristics and requirements as the input reagent vessels 151. However, the tubing from the bulk reagent vessel 152 may not interact with any pump 105. During operation of the reactor system 100, fluid from the bulk reagent vessel 152 will automatically be drawn into the consumable 150 due to the peristaltic properties of the reactor 101. In one example, only one (1) bulk reagent vessel 152 is needed per the consumable 150. In one embodiment, the ingredient with the highest percentage by volume may be added to the bulk reagent vessel 152.

The drum assembly 154 may be included as a portion of the consumable 150 that rotates during operation of the reactor system 100. To prevent the tubes coupled to the outlet 155 or inlet 156 of the consumable 150 from twisting or tangling, a rotary seal 153 may be incorporated into the drum assembly 154. The purpose of the rotary seal 153 is to allow for the transfer of fluids in and out of the consumable 150 during operation of the reactor system 100 without twisting or tangling up the tubing couped to the outlet 155 or the inlets 156. The rotary seal 153 serves as a dynamic fluidic junction for the inputs and output of the consumable 150. The rotary seal 153 may be constructed from two subassemblies that may rotate relative to one another. During operation of the reactor system 100, the rotary seal 153 is capable of maintaining a functionally-closed and/or hermetically sealed system that prevents ingress of any contamination, including but not limited to particulates, bacteria, yeast, or viruses. As depicted in FIG. 1, all input reagent vessels 151 and the bulk reagent vessel 152 may be connected to the rotary seal 153. The outlet 155 of the consumable 150 also passes through the rotary seal 153.

The rotary seal 153 may be constructed using a variety of techniques. Multiple lumens, or cannulas, with matched radial seals may be utilized. However, alternative techniques, such as in a 'skip-rope' embodiment may also be utilized.

As depicted in FIG. 1, all fluidic junctions (i.e., inlets and outlets) may be located on the same end of drum assembly 154. This design improves usability and is optimized for laboratory benchtop applications. In other embodiments, it is possible to have inlets on one end of drum assembly 154 and an outlet on the opposite end. In this embodiment, two (2) rotary seals 153 may be utilized.

The final product, also referred to as the "reacted product." may exit the consumable 150 through the outlet 155. The outlet 155 may be connected to any system downstream of the reactor 101 of the reactor system 100. For example, the outlet 155 may be connected to a bioreactor, a fill-and-finish machine, a liquid handling station, an additional reactor 101, or other downstream equipment. If another chemical or biological reaction is needed, the outlet 155 may be connected to another reactor 101. In this case, the outlet 155 may be connected to any of the inlets of the downstream consumable 150, including the downstream bulk reagent vessel 152 or a downstream input reagent vessel 151.

Figure 2A:
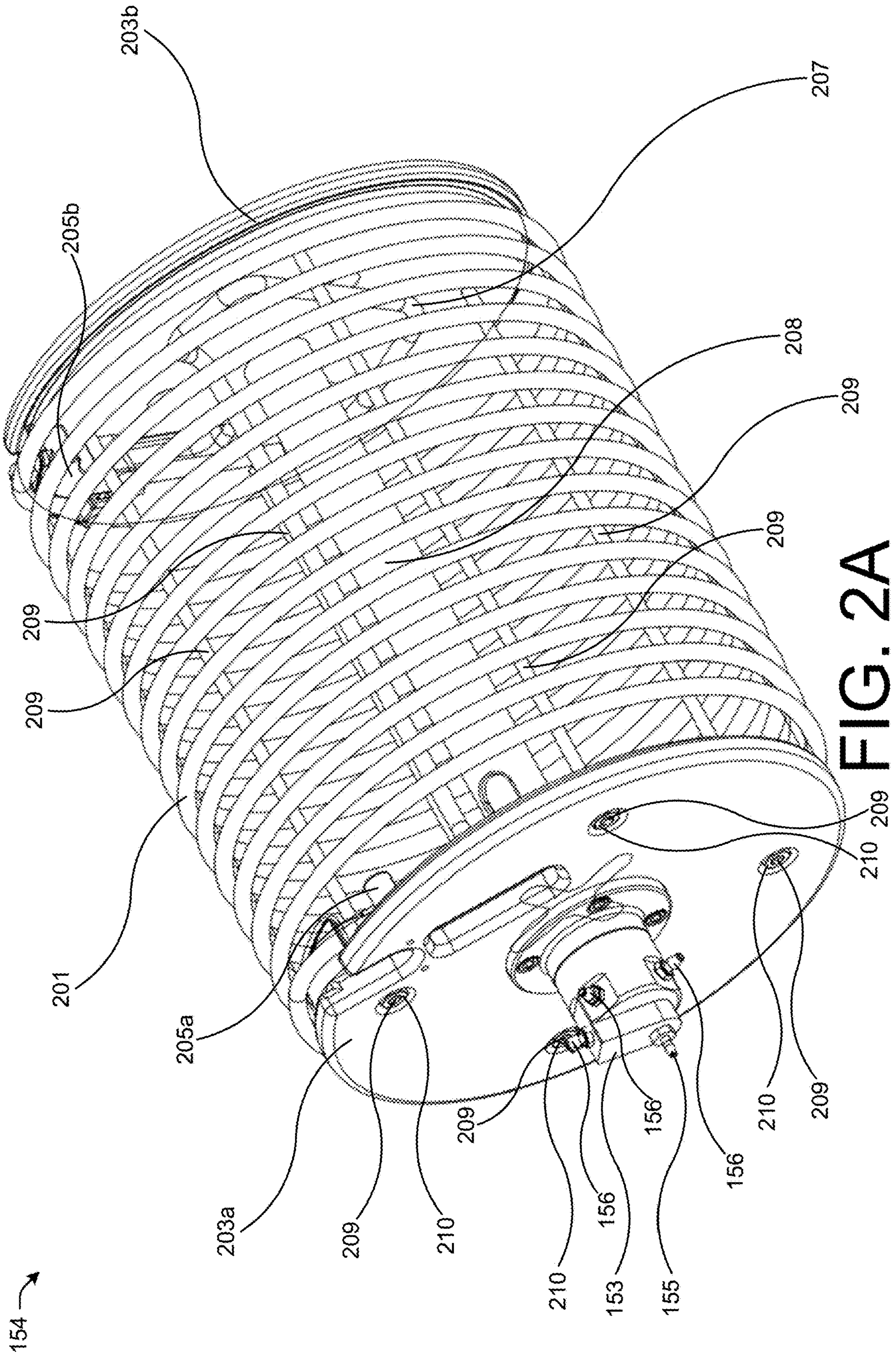
FIG. 2A illustrates an isometric view of an isolated drum assembly, according to an example of the principles described herein.
Figure 2B:
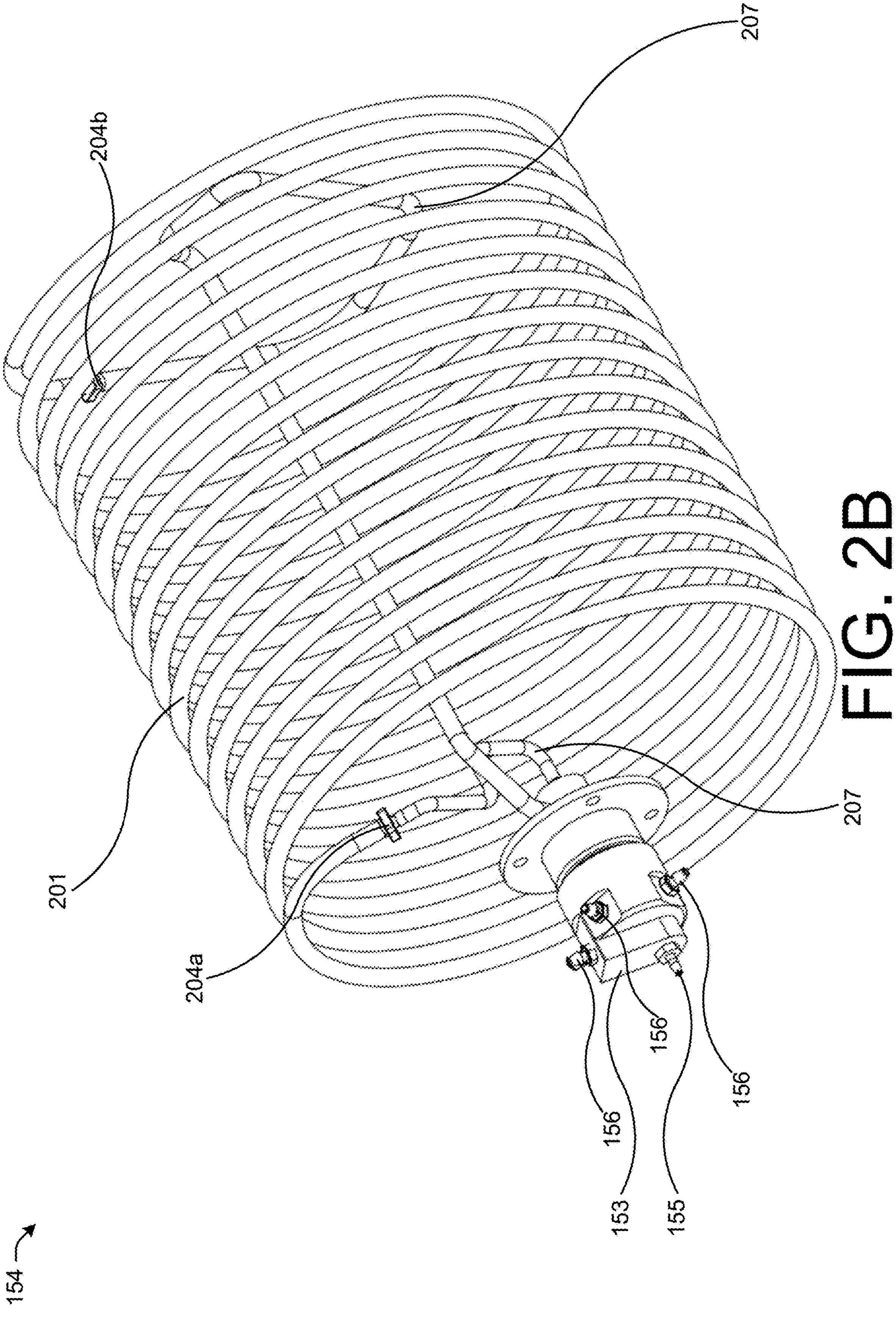
FIG. 2B illustrates an isometric view of an isolated fluid path of the drum assembly of FIG. 2A, according to an example of the principles described herein.
Figure 2C:
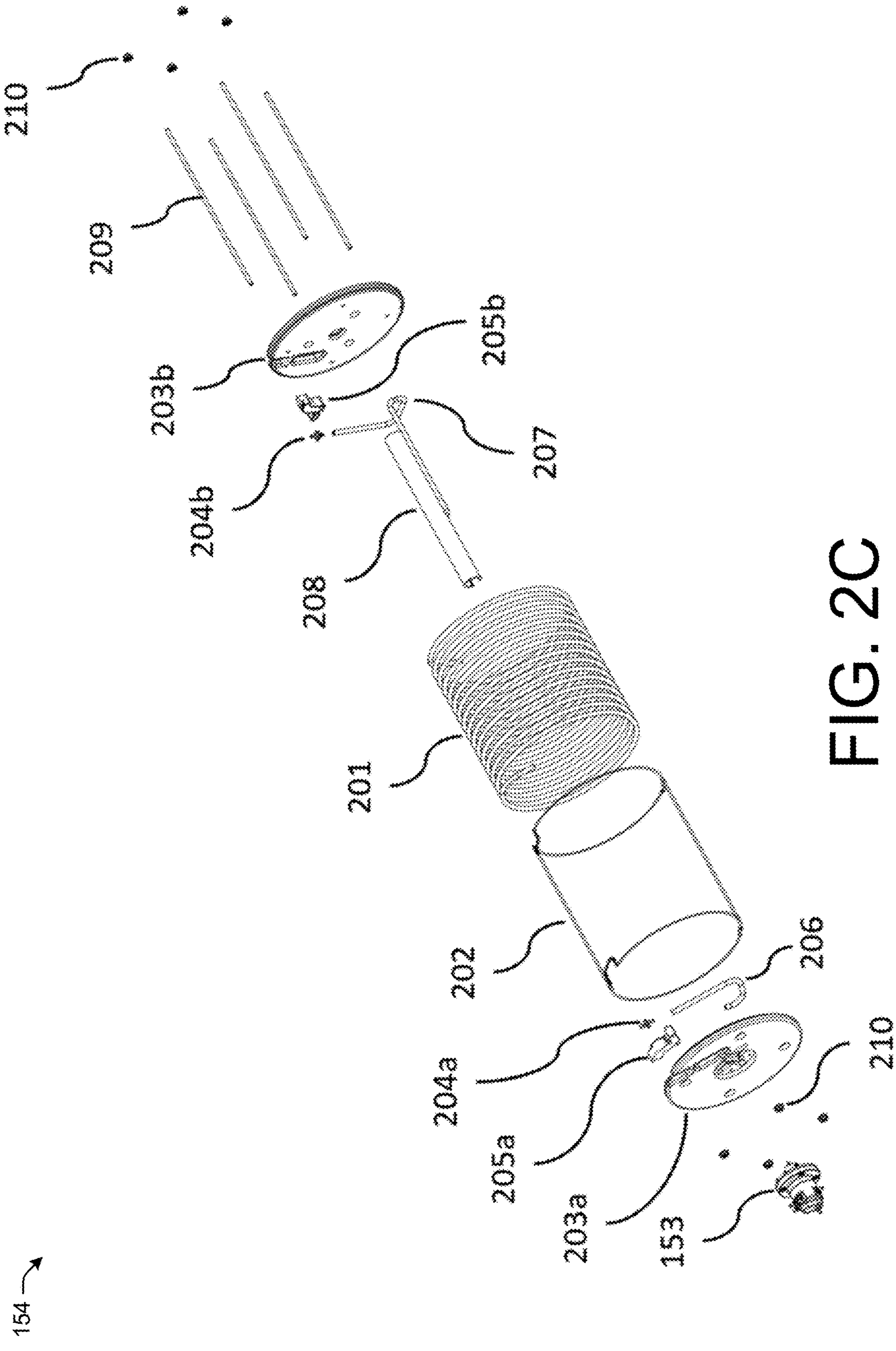
FIG. 2C illustrates an isometric exploded view of an isolated drum assembly of FIG. 2A, according to an example of the principles described herein.

FIG. 2A illustrates an isometric view of an isolated drum assembly 154, according to an example of the principles described herein. FIG. 2B illustrates an isometric view of an isolated tubing 201 (e.g., the fluid path) of the drum assembly 154 of FIG. 2A, according to an example of the principles described herein. FIG. 2C illustrates an isometric exploded view of an isolated drum assembly 154 of FIG. 2A, according to an example of the principles described herein. As depicted in FIG. 2C, the drum assembly 154 may include tubing 201; a drum 202; end plates 203*a* and 203*b*; fittings 204*a* and 204*b*; anchors 205*a* and 205*b*; unreacted tubing 206; reacted tubing 207; an alignment sleeve 208; tensioners 209; and nuts 210.

Tubing 201 may serve as the main lumen in which liquid flows through the consumable 150. In one embodiment, a single length of tubing may be wrapped around drum 202 to create the tubing 201. The tubing 201 may be made from PVC, TPE, silicone, or any other material that is compatible with peristaltic pumps. The tubing 201 may have different dimensions depending on the application. In some embodiments, the tubing 201 may have an inner diameter between 1/32 of an inch (in.) and 2 in., and a wall thickness between 1/16 in. and 1/2 in. Moreover, the length of the tubing 201 may vary depending on the desired incubation time and flow rate of the reactor 101. In some embodiments, the length of the tubing 201 may be increased to increase the output and/or flow rate of the reactor 101. The tubing 201 may have a length between 2 feet (ft.) and 250 ft.

To maintain the position and tension of the tubing 201 during operation of the reactor 101, both ends of the tubing 201 may be anchored to end plates 203*a* and 203*b*. To achieve this, fittings 204*a* and 204*b* may be connected to the ends of the tubing 201. The fittings 204*a* and 204*b* may take the form of barbed tube fittings, Luer fittings, or any other suitable fittings. The tubing 201 may then be further secured to fittings 204*a* and 204*b* by means of zip ties, Oetiker fittings, or other devices that may be used to secure the tubing 201 to the fittings 204*a* and 204*b*. Once joined to the tubing 201, the fittings 204*a* and 204*b* are then captured by anchors 205*a* and 205*b*. Anchors 205*a* and 205*b* may be unique parts that are pre-fastened to end plates 203*a* and 203*b*, respectively, as depicted in FIG. 2B, or they may be integrated into end plates 203*a* and 203*b*.

Unreacted tubing 206 may be used to connect the tubing 201 to the inlet side of the rotary seal 153. The internal volume of unreacted tubing 206 may be minimized. As depicted in FIG. 2C, the unreacted tubing 206 may connect to the rotary seal 153 and fitting 204*a* by means of tube barbs or any other suitable means. To increase the homogeneity of the liquid mixture after exiting the rotary seal 153 and prior to entering the tubing 201, static mixer elements may be installed within unreacted tubing 206. The unreacted tubing 206 may be referred to as such since it is through this tubing through which unreacted liquids or other materials may be injected into the tubing 201 in preparation for reaction with other liquids.

Reacted tubing 207 is used to connect the tubing 201 to the outlet side of the rotary seal 153. The internal volume of reacted tubing 207 may also be minimized. As depicted in FIG. 2C, reacted tubing 207 may connect to the rotary seal 153 and fitting 204*b* by means of tube barbs or any other suitable means. To decrease the amount of time the reacted product remains within reacted tubing 207, a sterile air filter and check valve (not depicted) may be incorporated into fitting 204*b* to allow sterile air to enter the tubing at this fluidic junction. Thus, in one example, the fitting 204*b* may include an air filter and/or a check valve. This modification will allow equipment downstream of the reactor 101 to pull the reacted product at a higher flowrate than the reactor 101 may be operating. In contrast to the unreacted tubing 206 described herein, the reacted tubing 207 may be referred to as such since it is through this tubing through which reacted liquids or other materials may be removed from the tubing 201 as an output of the reactor system 100.

The drum 202 provides a rigid foundation on which the tubing 201 may be coiled around. The rigidity of drum 202 forces the tubing 201 to compress when compressive forces are applied by the reactor 101. The drum 202 may be made from a single material, such as plastic, composite, metal, or cardboard. In other embodiments, the drum 202 may be made from multiple materials to balance cost, durability, and sustainability. Cutouts on either end of drum 202 may be used to position end plates 203*a*, 203*b* and prevent relative rotation during operation of the reactor 101.

The end plates 203*a* and 203*b* serve multiple purposes. The end plates 203*a* and 203*b* may reinforce the drum 202 and help to maintain the cylindrical shape of the drum 202 during operation of the reactor 101. The end plate 203*a* may serve as a mounting point for the rotary seal 153 and the anchor 205*a*. The end plate 203*b* serves as an interface with the reactor 101 and rotational forces from the reactor 101 are transferred into the drum assembly 154 through end plate 203*b*. The end plates 203*a* and 203*b* may be identical parts or made with unique geometry. The end plates 203*a*, 203*b* may be made from a variety of materials including but not limited to plastic, metal, ceramic, and composite. Labels containing characteristics of the drum assembly 154 may be applied to any surface of drum assembly 154. These labels may communicate with the reactor system 100 to appropriately set system operational parameters. The labels may include information such as the tubing 201 material, diameter, durometer, and number of coils or loops around drum 202. Further, the labels may take the form of a quick-response code (QR) code in which any information regarding the drum assembly 154 and its constituent parts.

The alignment sleeve 208 is used during the assembly process of drum assembly 154. It provides an axis on which the drum assembly 154 may rotate. Thus, the alignment sleeve 208 is utilized when wrapping the tubing 201 around drum 202.

The tensioners 209 are used to keep tension throughout drum assembly 154, thus keeping all components in spatial alignment. As depicted in FIG. 2C, four (4) tensioners 209 may be used. In other embodiments, between one (1) and twelve (12) tensioners may be used. The tensioners 209 may be made from metal or plastic, and in the example depicted in FIG. 2C, stainless steel all thread (e.g., threaded rods) may be used as the tensioners 209. Nuts 210 are used to compress the assembly.

Figure 3A:
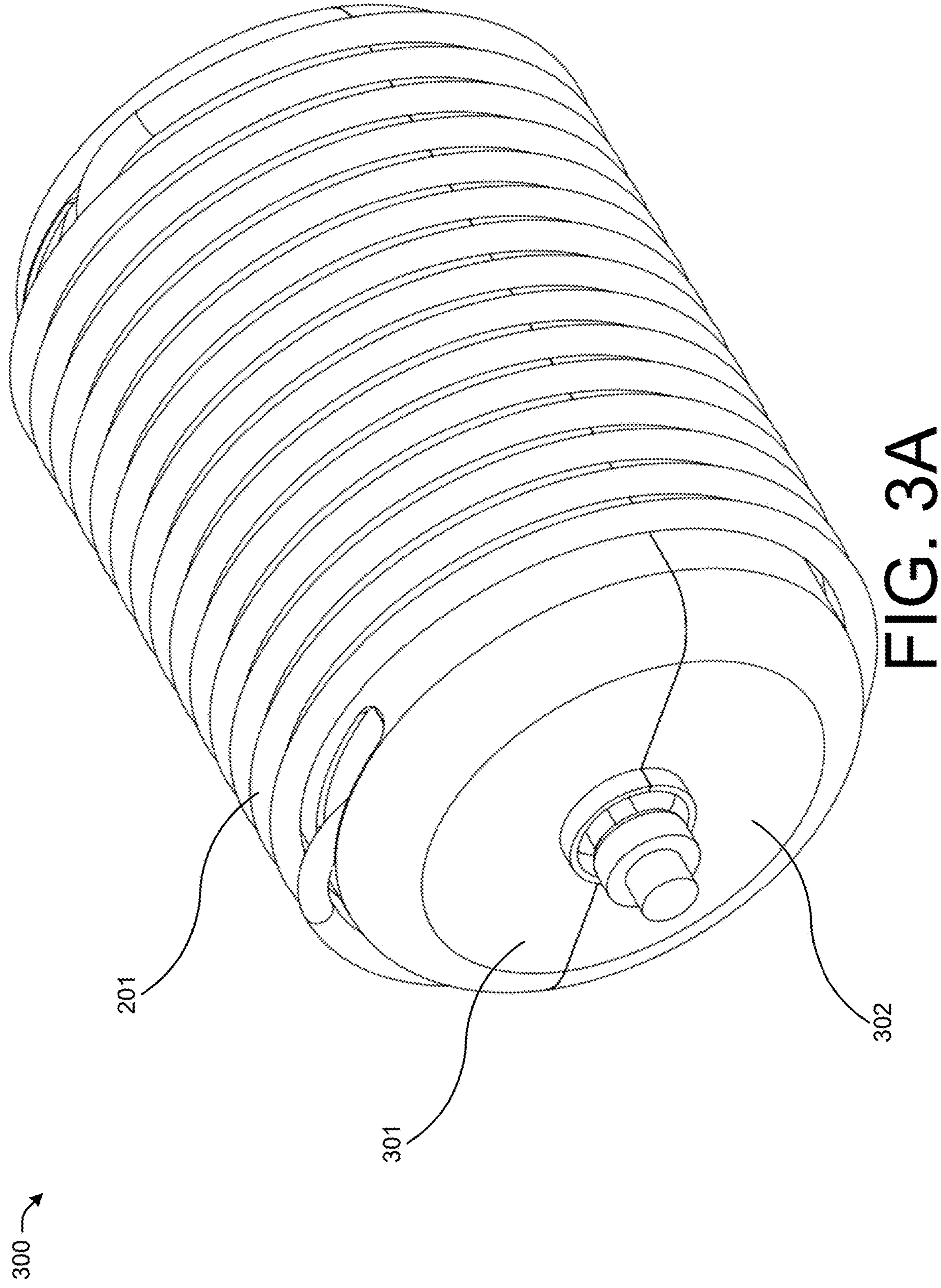
FIG. 3A illustrates an isometric view of a drum assembly, according to an example of the principles described herein.
Figure 3B:
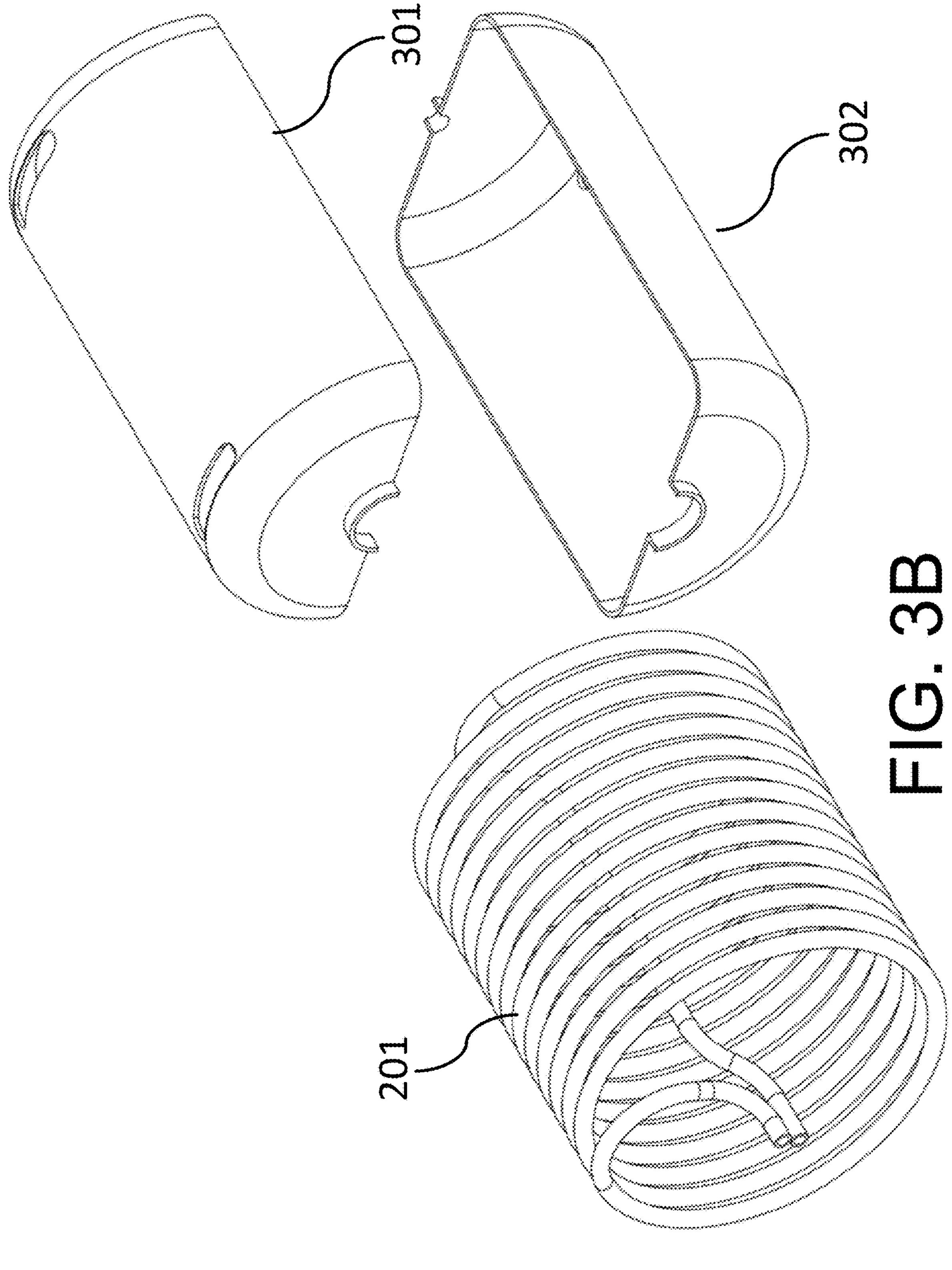
FIG. 3B illustrates an isometric exploded view of a manufacturing technique of a drum assembly, according to an example of the principles described herein.

FIG. 3A illustrates an isometric view of a drum assembly 300, according to an example of the principles described herein. FIG. 3B illustrates an isometric exploded view of a manufacturing technique of a drum assembly 300, according to an example of the principles described herein. As depicted in FIG. 2C, the drum 202 may be manufactured as a single piece by processes such as extrusion, rotational molding, or blow molding. In another embodiment, as depicted in FIGS. 3A and 3B, the drum assembly 154 of the drum assembly 300 may be manufactured in sections by means of injection molding or thermoforming. In the embodiment depicted in FIG. 3B, halves 301 and 302 may be identical or unique. In yet other embodiments, more than two sections may be assembled to form the drum assembly 154. For example, three or four pieces may be assembled to make a drum assembly 154.

Figure 4A:
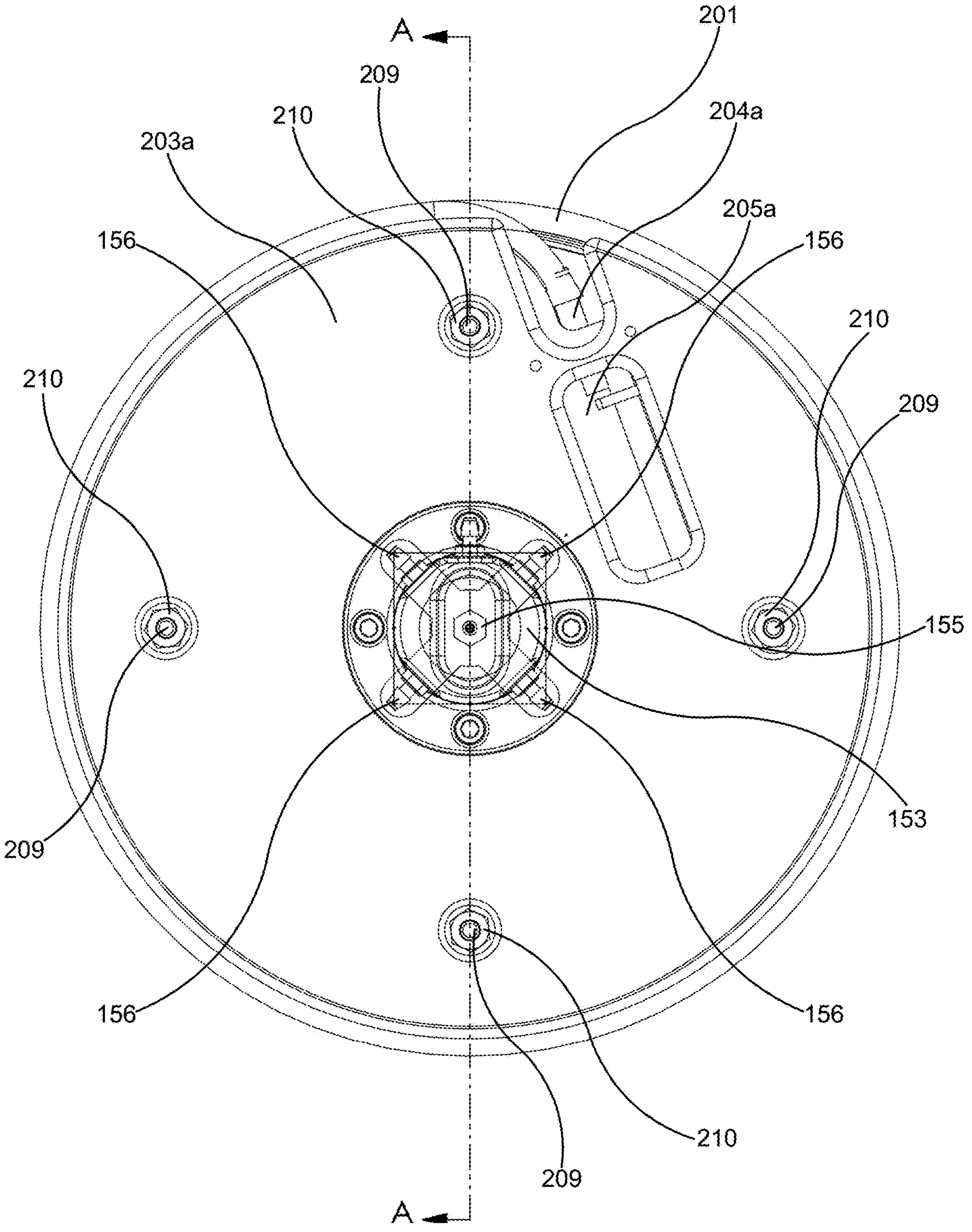
FIG. 4A illustrates a front view of a rotary seal, according to an example of the principles described herein.
Figure 4B:
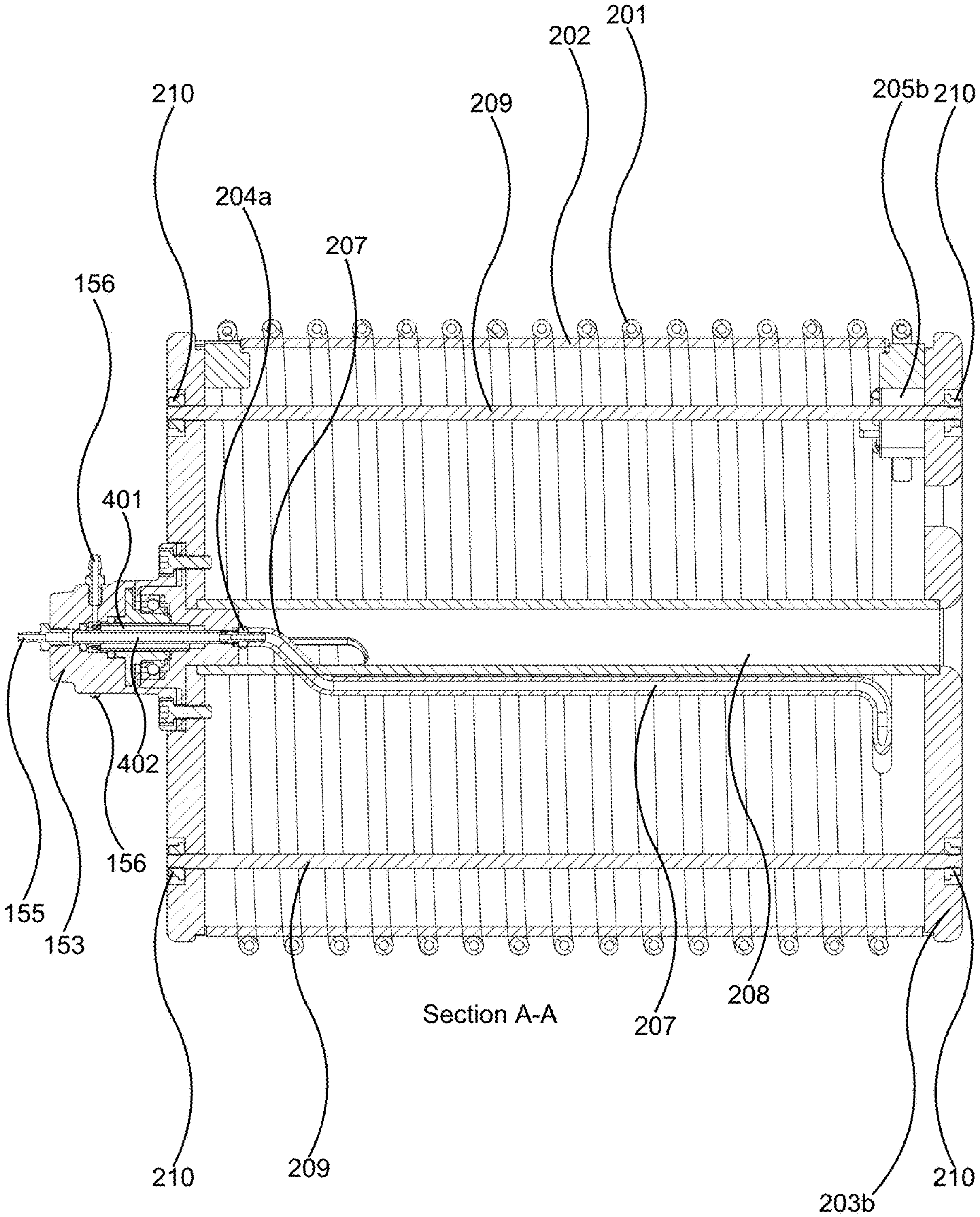
FIG. 4B illustrates a cross-sectional view of the rotary seal of FIG. 4A along line A-A of FIG. 4A, according to an example of the principles described herein.
Figure 4C:
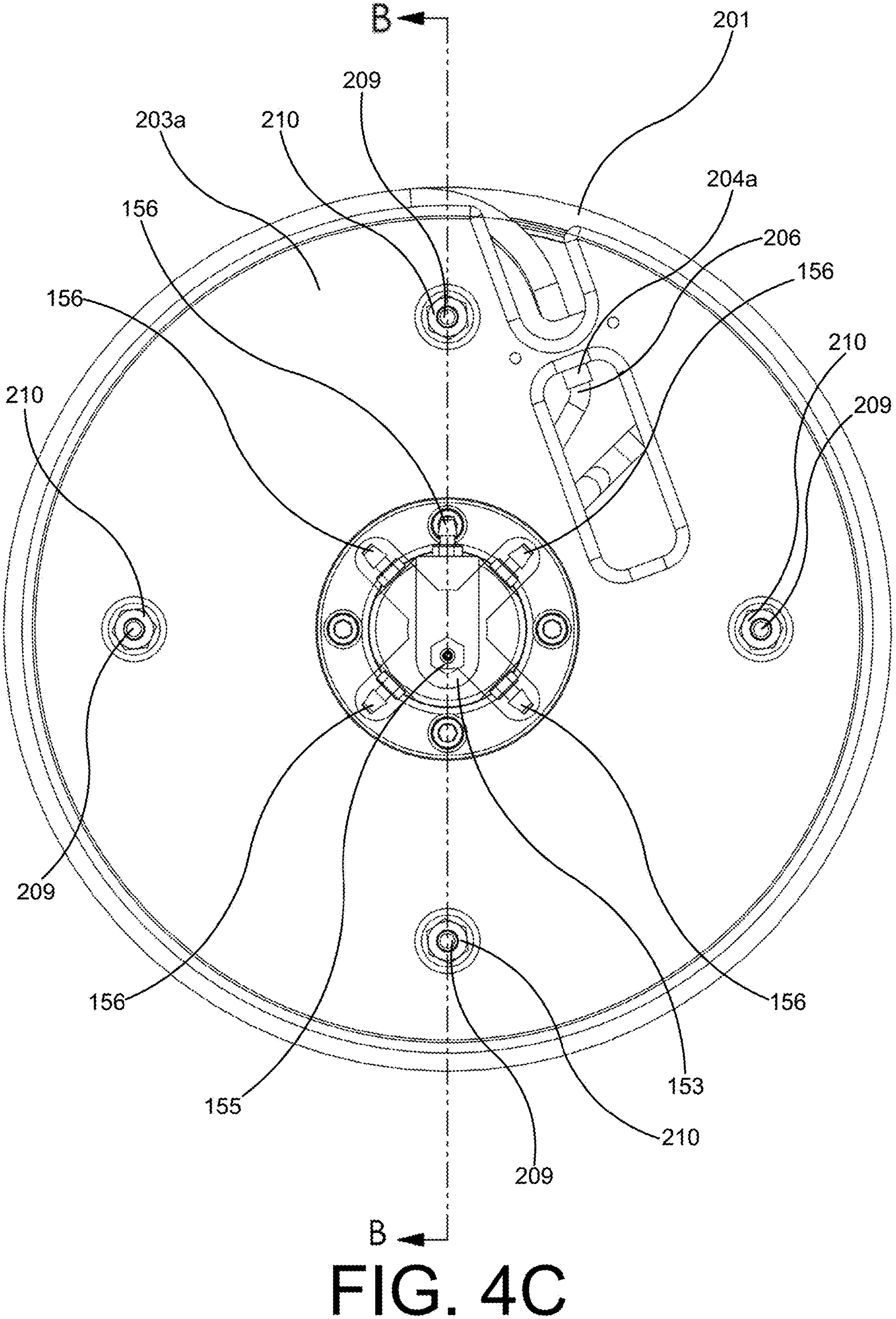
FIG. 4C illustrates a front view of a rotary seal, according to an example of the principles described herein.
Figure 4D:
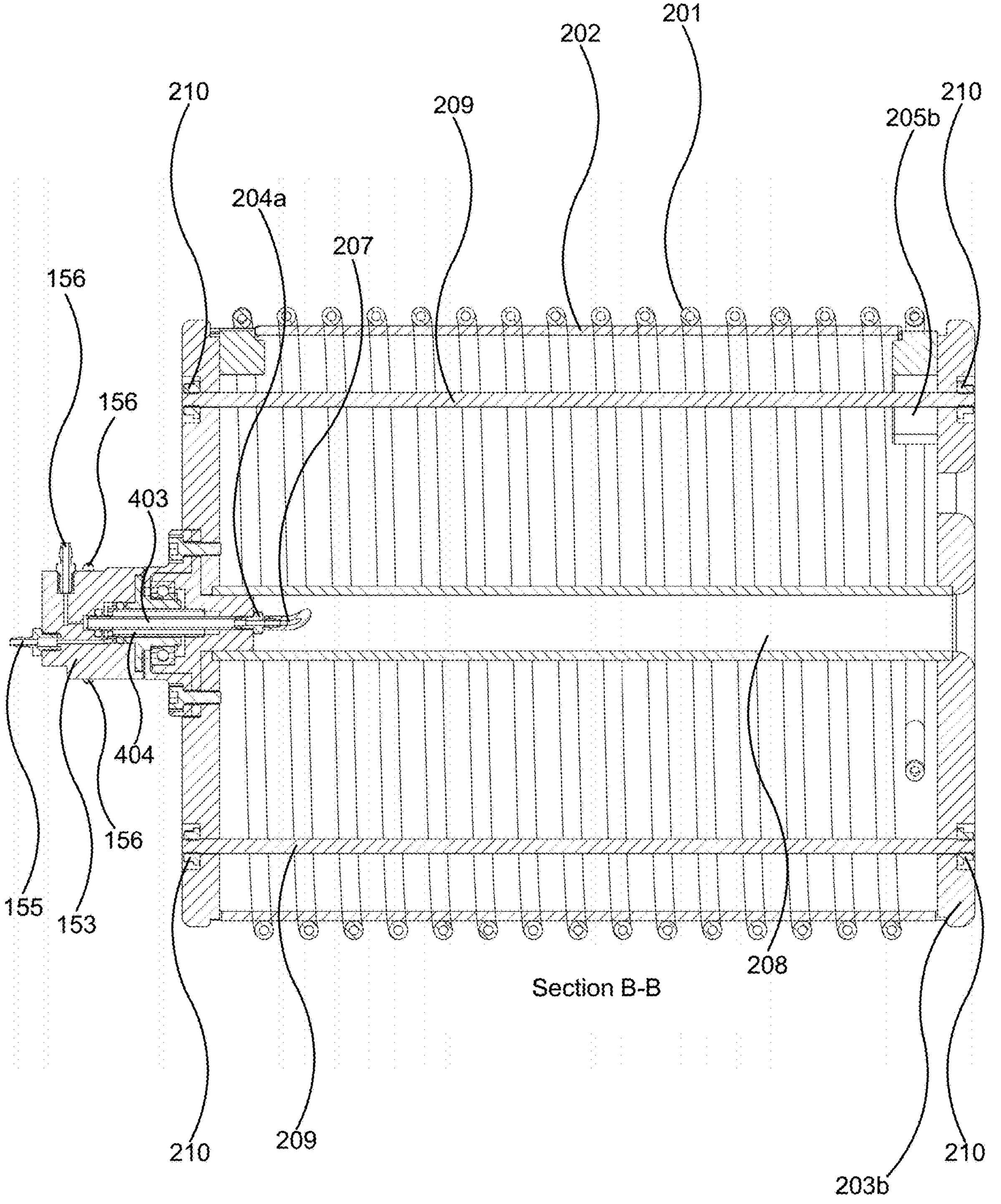
FIG. 4D illustrates a cross-sectional view of the rotary seal of FIG. 4C along line B-B of FIG. 4C, according to an example of the principles described herein.

FIG. 4A illustrates a front view of a rotary seal 153, according to an example of the principles described herein. FIG. 4B illustrates a cross-sectional view of the rotary seal 153 of FIG. 4A along line A-A of FIG. 4A, according to an example of the principles described herein. FIG. 4C illustrates a front view of a rotary seal 153, according to an example of the principles described herein. FIG. 4D illustrates a cross-sectional view of the rotary seal 153 of FIG. 4C along line B-B of FIG. 4C, according to an example of the principles described herein. There are many potential configurations of the rotary seal 153. Depending on the application, it may be beneficial to modify the rotary seal geometry to achieve a desired outcome, such as to improve mixing or limiting dead volume. Two (2) of such embodiments are depicted in FIGS. 4A through 4D. Both FIGS. 4A through 4D show a double-lumen rotary seal with O-ring radial seals. However, the rotary seal depicted in FIGS. 4A and 4B has an inner lumen 402 as the output and an outer lumen 401 as the input. In contrast, the rotary seal depicted in FIGS. 4C and 4D has the inner lumen 403 as the input and an outer lumen 404 as an output. Thus, the various inputs and outputs of the drum assembly 154 may have various arrangements of the outlet 155 and a plurality of inlets 156. These depictions are presented to illustrate the broad range of designs and customization that may be incorporated into the rotary seal 153.

Figure 5A:
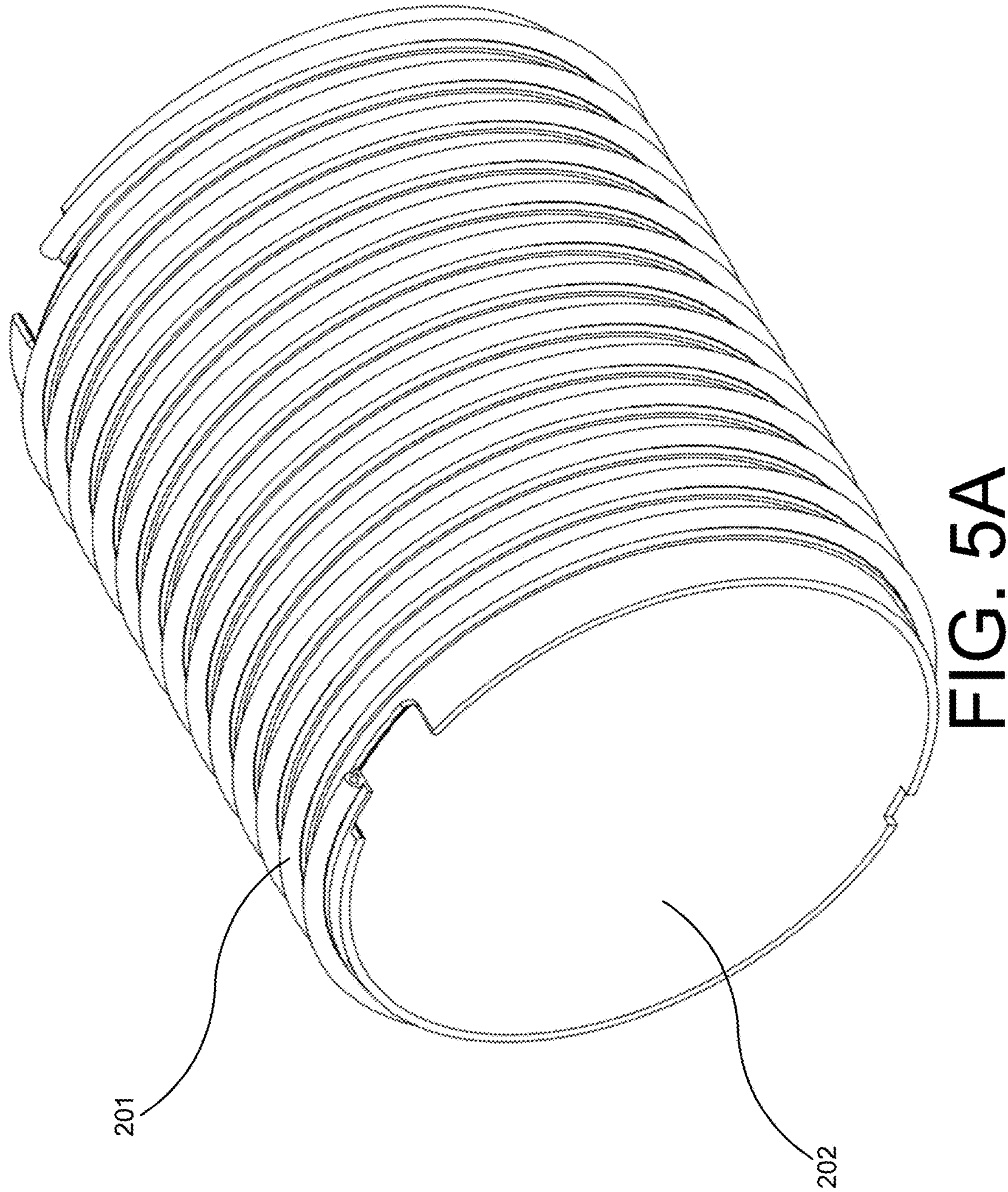
FIG. 5A illustrates a tubing wrapped around a drum, according to an example of the principles described herein.
Figure 5B:
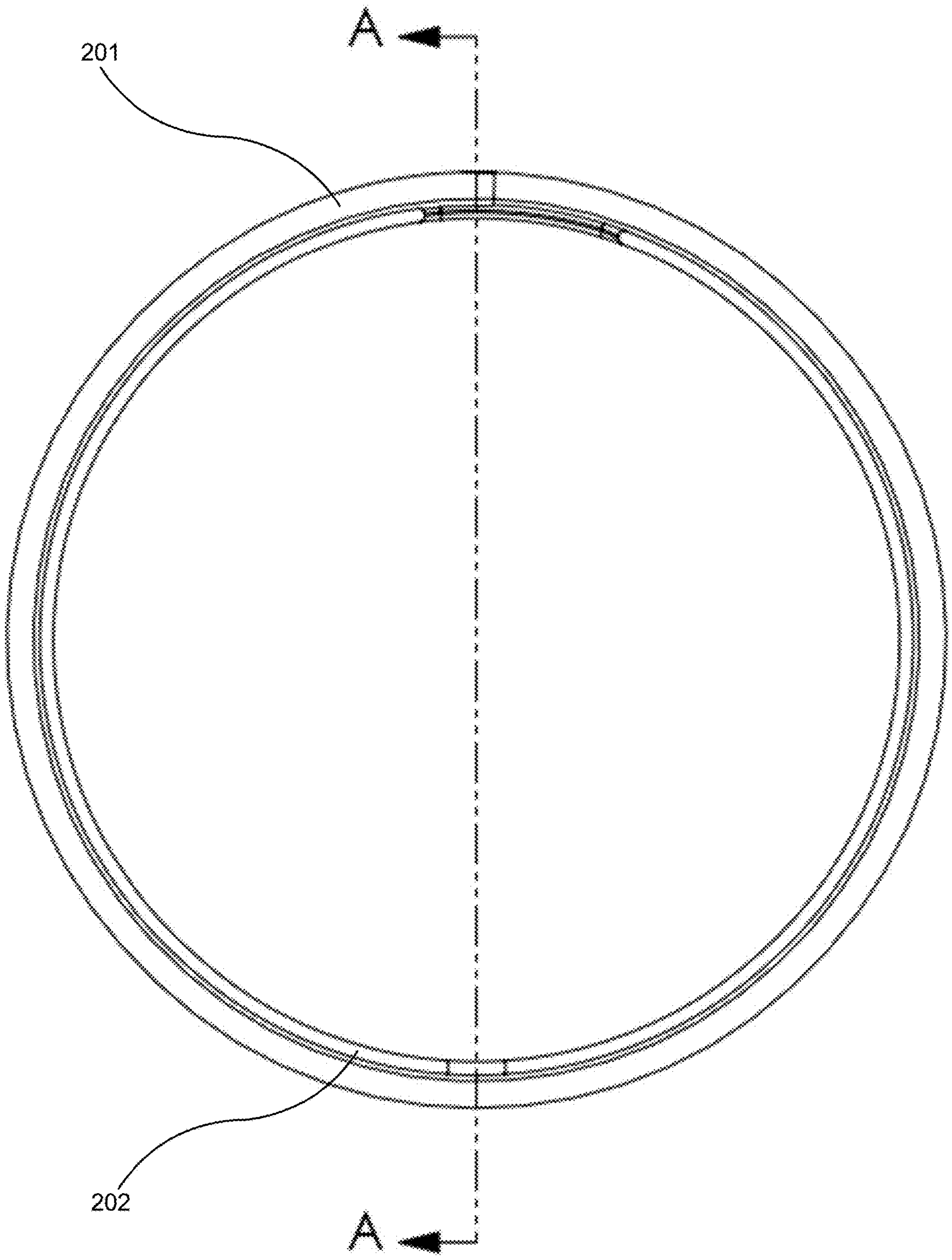
FIG. 5B illustrates a front view of the tubing wrapped around the drum of FIG. 5A, according to an example of the principles described herein.
Figure 5C:
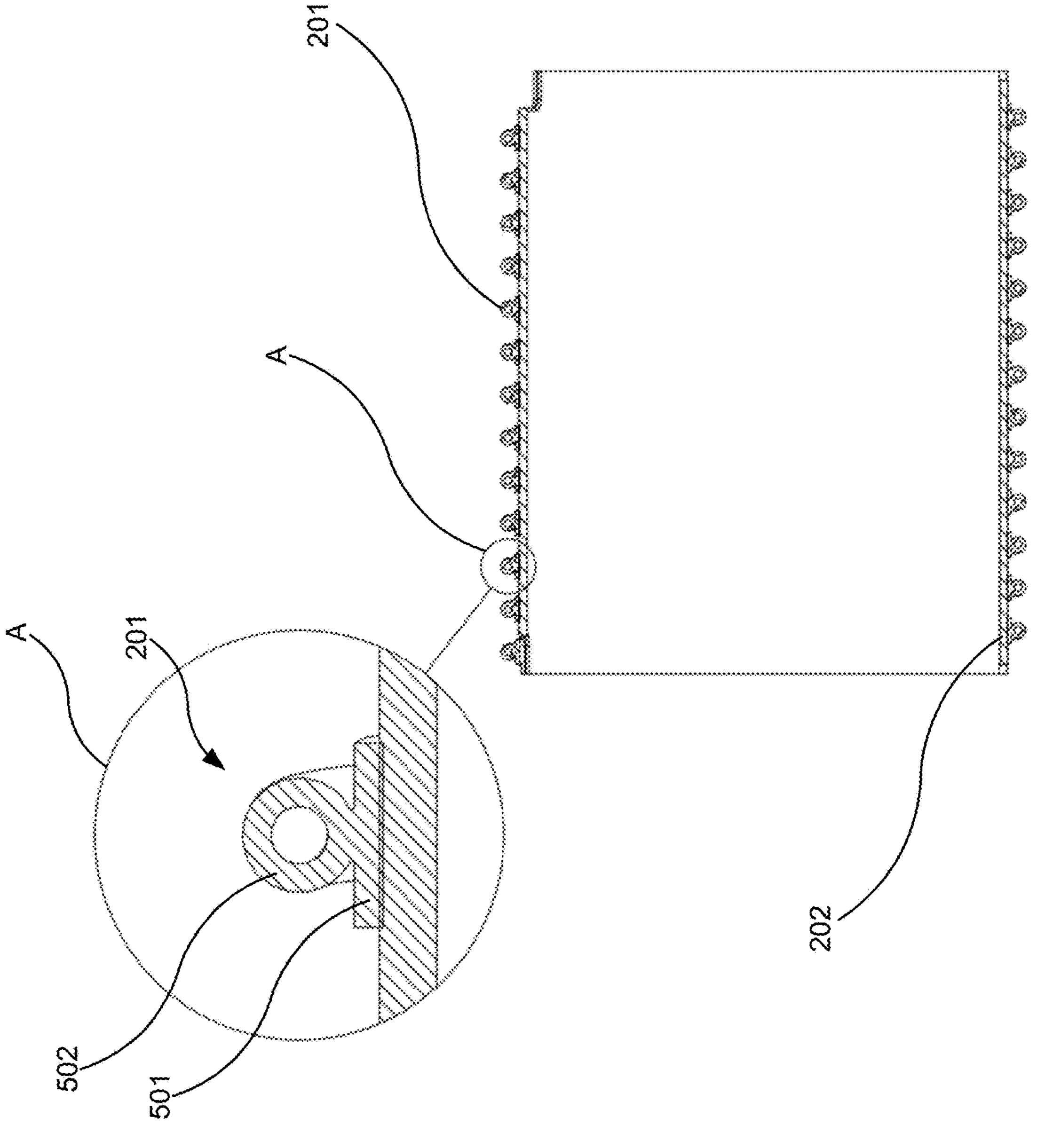
FIG. 5C illustrates a cross-sectional view of the tubing wrapped around the drum of FIGS. 5A and 5B along line A-A of FIG. 5B and an enlarged view of the portion of the tubing within circle A, according to an example of the principles described herein.

FIG. 5A illustrates a tubing 201 wrapped around a drum 202, according to an example of the principles described herein. FIG. 5B illustrates a front view of the tubing 201 wrapped around the drum 202 of FIG. 5A, according to an example of the principles described herein. FIG. 5C illustrates a cross-sectional view of the tubing 201 wrapped around the drum 202 of FIGS. 5A and 5B along line A-A of FIG. 5B and an enlarged view of the portion of the tubing 201 within circle A, according to an example of the principles described herein. The standard cross-section of the tubing 201 may be circular which aligns with commercially available pump tubing. However, it may be beneficial under certain operating conditions to modify the cross-sectional of the tubing 201. Such modifications may be made to improve performance of the reactor system 100 by increasing the durability, processing volumes, and consistency of the consumable 150. One such embodiment is depicted in FIG. 5C. As depicted in FIG. 5C, a flat section 501 may be added to the circular cross-sectional 502 of the tubing 201. This added flat section 501 increases the friction between the tubing 201 and drum 202. This added friction will help to prevent any unwanted tube movement during operation of the reactor system 100. This geometry, and variations of it, may be custom extruded from many suitable materials, such as TPE, silicone, or PVC.

Figure 6:
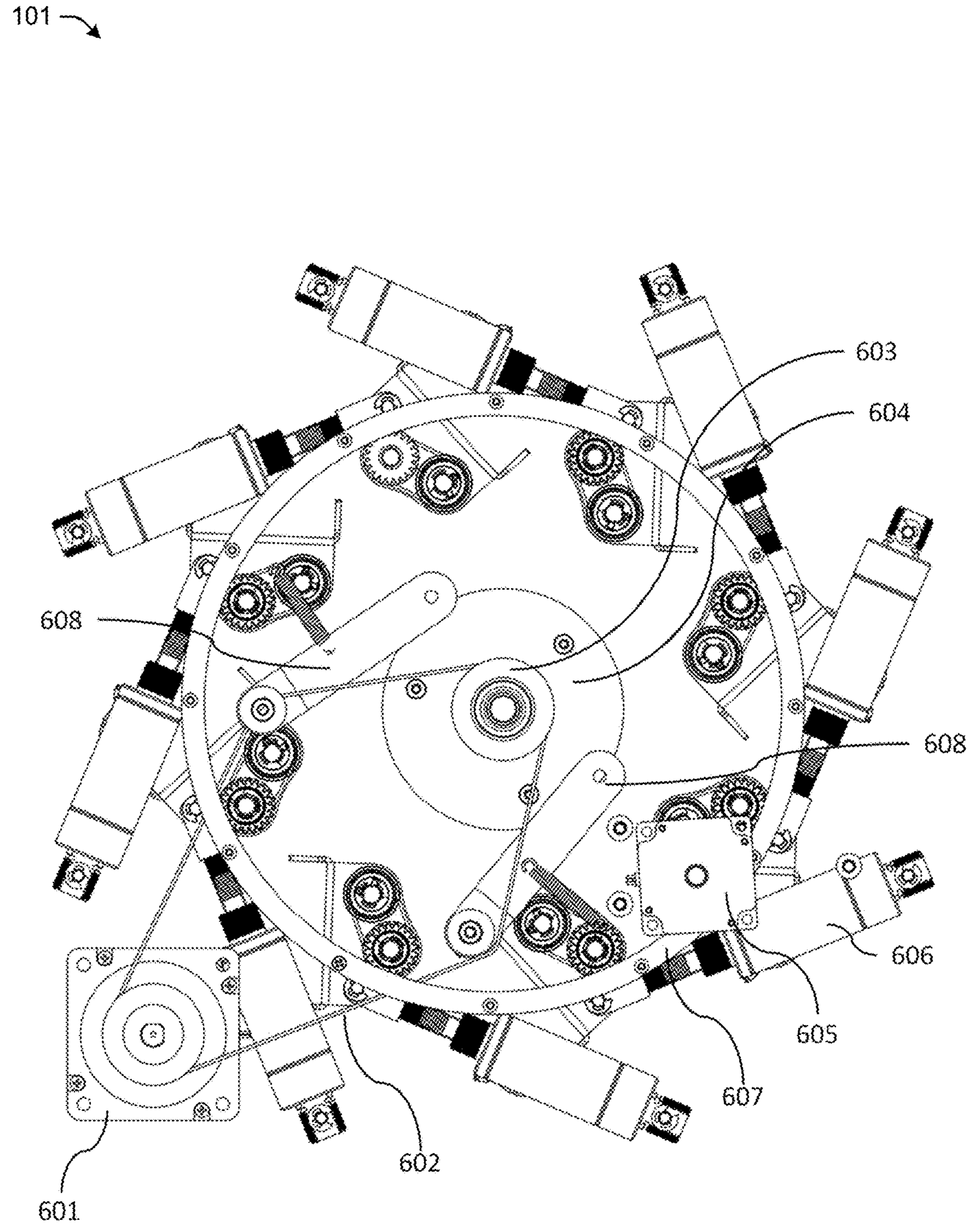
FIG. 6 illustrates a rear view of the reactor depicting internal components, according to an example of the principles described herein.

FIG. 6 illustrates a rear view of the reactor 101 depicting internal components, according to an example of the principles described herein. Some components are not depicted to better illustrate the individual components of the reactor 101. The internal components of the reactor 101 include a drum motor 601, the drum motor belt 602, a pulley 603, a consumable interface 604, a roller motor 605, roller assemblies 606, a ring gear 607, and a motor balancing system 608.

The drum motor 601 is used to rotate the consumable interface 604 and, in turn, rotating the drum assembly 154 of the consumable 150 when installed on the reactor 101. The drum motor 601 may be any type of suitable motor, including but not limited to a stepper motor or servo motor. As depicted in FIG. 6, the drum motor 601 may be mounted without axial alignment to the consumable interface 604 to minimize the physical depth of the reactor 101. As depicted in FIG. 6, the drum motor 601 may be mechanically coupled to the consumable interface 604 by means of the drum motor belt 602 and the pulley 603. Alternatively, a chain or gear train may be used instead of a belt such as the drum motor belt 602. In an alternative embodiment, the drum motor 601 may be axially aligned with the consumable interface 604 in what may be referred to as a direct drive system. The drum motor 601 may be fitted with sensors, such as an encoder, to allow for precise positioning and/or control of the consumable interface 604 during operation.

The roller motor 605 is used to rotate the rollers (described in more detail herein) within each roller assembly 606. The roller motor 605 may be any type of suitable motor, including but not limited to a stepper motor or servo motor. As depicted in FIG. 6, the roller motor 605 may be mounted without axial alignment to any components of any roller assembly 606. As depicted in FIG. 6, the roller motor 605 may be mechanically coupled to roller assemblies 606 by means of ring gear 607. In this embodiment, a gear on the output shaft of the roller motor 605 meshes with internal gear teeth on ring gear 607. This design ensures that all the rollers of the roller assemblies 606 rotate synchronously. Alternatively, a belt, chain or gear train may be used. As depicted in FIG. 6, one (1) the roller motor 605 may provide rotational forces to all roller assemblies 606. In another embodiment, multiple roller motors 605 may be used. For example, if the reactor 101 is fitted with eight (8) roller assemblies 606, between one (1) and eight (8) roller motors 605 may be used. Although at least one (1) roller assembly 606 is required per the reactor 101, eighteen (18) or more roller assemblies 606 may be used. The roller motor 605 may be fitted with sensors, such as an encoder, to allow for precision control of roller angular velocities. Gearing may also be used to adjust motor torque as needed.

During operation of the reactor 101, the relative angular velocities of the drum motor 601 and the roller motor 605 may be balanced. To maintain balanced angular velocities, the motor balancing system 608 may be implemented. As depicted in FIG. 6, the motor balancing system 608 may include two (2) arms that preload tension into the drum motor belt 602 by means of springs. The reactor 101 may monitor the position of these two (2) arms. If the ratio of angular velocities of the two motors become imbalanced, the arms may rotate either clockwise or counterclockwise as one side of the drum motor belt 602 tensions and the other slacks. If the ratio is inverted, the arms may rotate in the opposite direction. By continuously adjusting the ratio of the angular velocities of the two motors to keep the motor balancing system in a neutral position, the reactor 101 may maintain balance between the drum motor 601 and the roller motor 605. Thus, the drum motor 601, the roller motor 605, and the motor balancing system 608, allows for the dynamic synchronization of the drum motor 601 and the roller motor 605 such that the rollers minimize shear forces in the tubing and increase longevity of the consumable.

Figure 7:
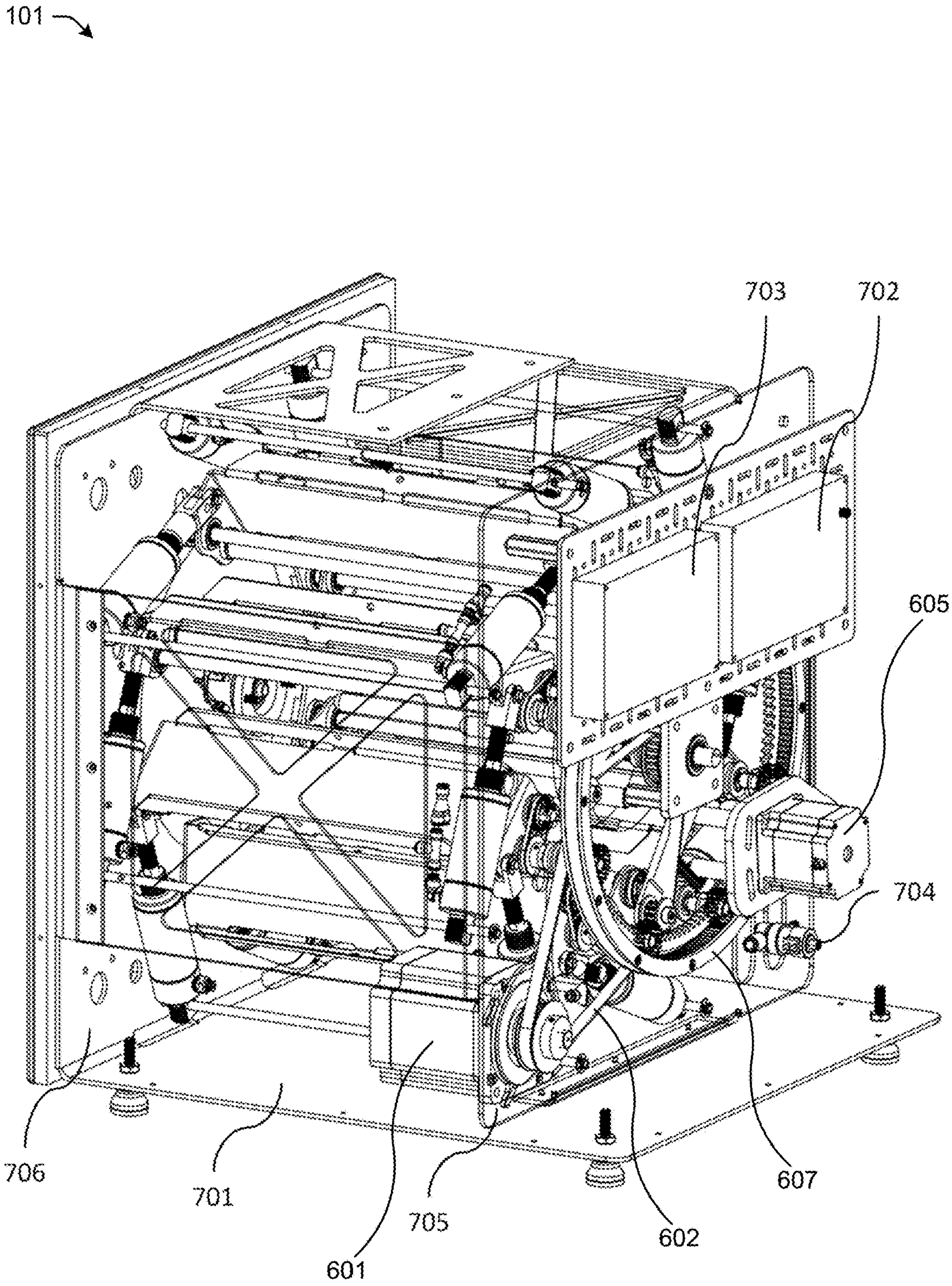
FIG. 7 illustrates an isometric rear view of the internals of a reactor, according to an example of the principles described herein.

FIG. 7 illustrates an isometric rear view of the internals of the reactor 101, according to an example of the principles described herein. Additional internal components of the reactor 101 are depicted in FIG. 7. These components include a base plate 701, a system controller 702, a thermal controller 703, a pneumatic controller 704, a rear support 705, and a front support 706. The base plate 701 serves as a rigid foundation on which the reactor 101 may be built. The base plate 701 may be made of metal, plastic, composites, or similar. Further, the base plate 701 may be thermally insulated to allow for the internal volume of the reactor 101 to be temperature controlled.

The system controller 702 may include all electronics required to operate the reactor 101 including selective activation of the drum motor 601 and the roller motor 605 and other electronically controllable elements of the reactor 101. The system controller 702 may include a controller, such as a micro-controllers developed and distributed by, for example, Arduino®, Raspberry Pi®, Teensy®, or others. The system controller 702 may further include power distribution hardware, motor drivers, and I/O modules. The system controller 702 may be mounted in any location within, or external to, the enclosure 102. Further, the system controller 702 may communicate with the computing device 104 as well as with external systems, such as automation systems, and may be controlled by external automation systems, such as a DeltaV™ distributed control system developed and distributed by Emerson Electric Co., an Allen-Bradley® industrial automation and control system developed and distributed by Rockwell Automation, a Siemens® automation system developed and distributed by Siemens Global, or other external automation systems.

The thermal controller 703 may be used to regulate the internal temperature of the reactor 101 by adding or removing thermal energy from the reactor 101. This may be achieved by leveraging several technologies, including but not limited to heat pumps, Peltier devices (e.g., thermoelectric cooling device(s)), resistive heating elements, or other cooling devices or methods. The thermal controller 703 may automatically and/or dynamically monitor the internal temperature of the reactor 101 and make appropriate temperature adjustments based on a protocol loaded by the system operator. The internal temperature range of the reactor 101 may be between 1° C. and 101° C. However, the internal temperature range of the reactor 101 may be maintained by the thermal controller 703 at any desired or defined temperature.

The pneumatic controller 704 allows the reactor 101 to automatically control any pneumatic components, such as pneumatic cylinders or actuators, by increasing or decreasing pressures. Pneumatic controller 704 may be designed to receive pressurized gas and then direct the flow and pressure to any subsystems or components within the reactor 101. Alternatively, if hydraulic components are used, a hydraulic controller may be designed to receive pressurized fluids such as hydraulic fluid and then direct the flow and pressure of the hydraulic fluid to any subsystems or components within the reactor 101.

Each roller assembly 606 may be mounted to both the rear support 705 and the front support 706. The rear support 705 and the front support 706 may be made from metal, ceramic, composite, or plastic, and may be secured to the base plate 701 by means of fasteners or welds. The rear support 705 may also provide mounting locations for the system controller 702, the thermal controller 703, the drum motor 601, the consumable interface 604, the roller motor 605, and the pneumatic controller 704. Both the front support 706 and the rear support 705 may be thermally insulated to allow for the internal volume of the reactor 101 to be temperature controlled.

Figure 8A:
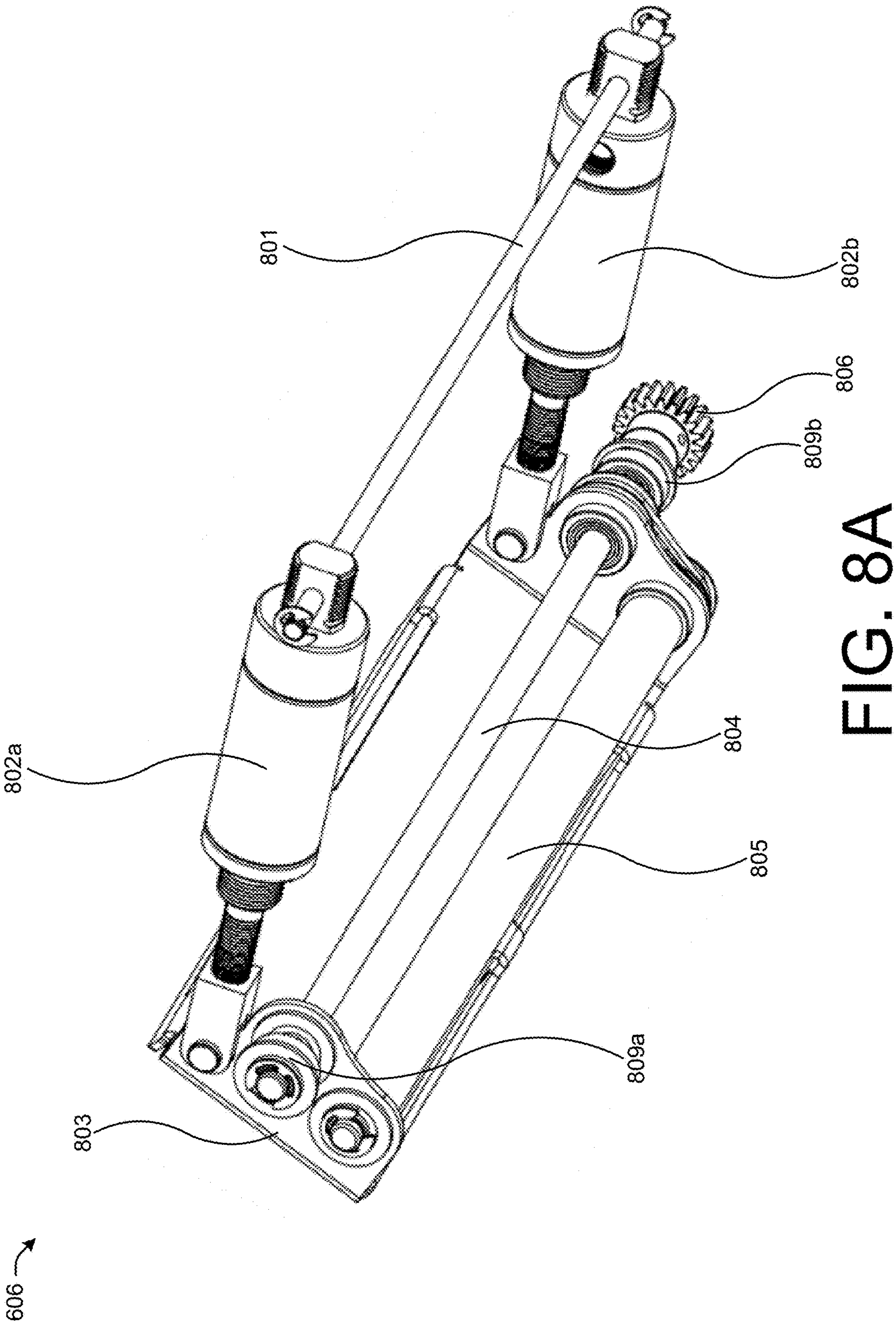
FIG. 8A illustrates an isometric view of a roller assembly, according to an example of the principles described herein.
Figure 8B:
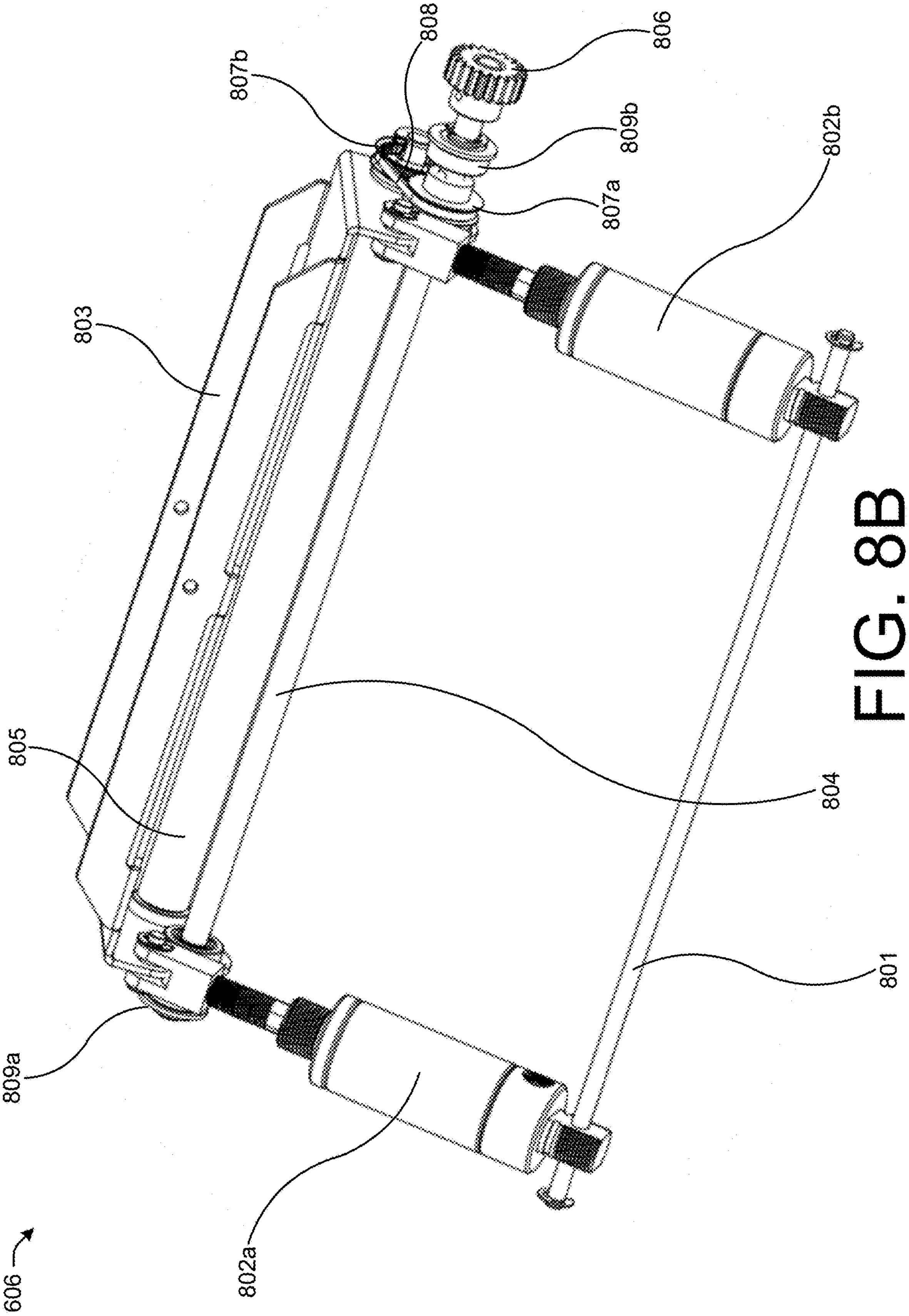
FIG. 8B illustrates an isometric view of a roller assembly, according to an example of the principles described herein.

FIG. 8A illustrates an isometric view of a roller assembly 606, according to an example of the principles described herein. FIG. 8B illustrates an isometric view of a roller assembly 606, according to an example of the principles described herein. FIGS. 8A and 8B depict an isolated view of one (1) roller assembly 606. The roller assemblies 606 may be used to compress the tubing 201 that is wrapped around drum assembly 154. Each roller assembly 606 may include a connecting rod 801, actuators 802*a*, 802*b* (collectively referred to herein as actuator(s) 802 unless specifically addressed otherwise), body 803, shaft 804, roller 805, gear 806, pulleys 807, roller belt 808, and bearings 809*a* and 809*b*.

The connecting rod 801 has a front end and a rear end. The front end of connecting rod 801 is attached to the front support 706. The rear end of connecting rod 801 is attached to the rear support 705. In one embodiment, the connecting rod 801 may be attached to the front and rear supports with fasteners. In one embodiment, the connecting rod 801 may be welded to the front and rear supports.

The connecting rod 801 may be constructed from metal, such as stainless steel, or any other suitable material. Connecting rod 801 may have a circular cross-sectional to allow for relative rotation of components installed. For example, connecting rod 801 serves as a pivot for the roller assemblies 606. In the example depicted in FIG. 9, there are eight (8) roller assemblies 606, and, thus, there are eight (8) connecting rods 801. In one embodiment, the connecting rod 801 may be replaced with two (2) shorter rods with one in each the front support 706 and rear support 705. In this embodiment, two (2) metal dowels or shoulder screws may be suitable alternatives to one (1) connecting rod 801.

The actuators 802 may be used to selectively position each roller assembly into an engaged position or into a disengaged position. A first end of the actuators 802 may be coupled to the connecting rod 801, and a second end of the actuators 802 may be coupled to the body 803. The second end of the actuators 802 coupled to the body 803 may be coupled using a hinged bracket that allows a piston of the actuators to rotate the body 803. The portion of the body 803 at which the actuators 802 are coupled may be at a first longitudinal axis of the body 803. When extended, the actuators 802 position each roller assembly 606 into an engaged position, a state in which the tubing 201 is compressed and the reactor 101 may operate. When retracted, the actuators transition each roller assembly into a disengaged position; a state in which the tubing 201 is disengaged and the consumable 150 may be installed into, or removed from, the reactor 101. The actuators 802 may be pneumatic, hydraulic, or electric. As depicted in FIGS. 8A and 8B, two (2) actuators are used, one at either end of connecting rod 801, however, other numbers of actuators may be used depending on the application. For example, a single actuator, located at the mid-point of connecting rod 801, may be used. Alternatively, multiple actuators (e.g., more than two) may be used to add force or evenly distribute forces across a roller assembly 606. The actuators 802 of each roller assembly may be connected fluidically or electrically such that they operate in unison.

Body 803 is configured to pivot about shaft 804 and is used to transfer forces from the actuators 802 into the roller 805. The shaft 804 may be coupled to the body at a second longitudinal axis of the body 803. The roller 805 may be coupled to the body at a third longitudinal axis of the body 803. The body 803 may be constructed of metal, such as stainless steel, plastic, or a composite material. For example, as depicted in FIGS. 8A and 8B, the body 803 is made from a single piece of bent sheet metal.

Each end of the body 803 has three axes, any of which may be fitted with a bearing or bushing. The positioning of these axes may be modified to increase mechanical advantage, or leverage, such that the actuators 802 provide an increase in force to roller 805 without changing the size of the actuators or the energy within them. In one embodiment, as seen in FIGS. 8A and 8B, the body 803 may be made from one piece of material. In one embodiment, the body 803 may be made from multiple pieces of material to allow for adjustability of stiffness.

In addition to providing a pivot axis and mounting location for the body 803, the shaft 804 may also be used to as a rotating shaft to transfer rotational energy from the roller motor 605 into roller 805 of each roller assembly 606. Bearings on either end of the shaft 804 may be included to allow the shaft 804 to rotate freely.

During operation of the reactor 101, the roller motor 605 rotates the ring gear 607. When the ring gear 607 rotates, the gear 806 in each roller assembly 606 rotates in unison. As both the gear 806 and the pulley 807*a* are fixed to the shaft 804, and the pulley 807*b* and the roller 805 are also axially fixed, the roller 805 may be driven by connecting the pulleys 807*a* and 807*b* by the roller belt 808. In one embodiment, the roller belt 808 may be replaced with a chain, gear train, or other suitable attachment method.

A mechanism, such as a ratchet or clutch, may be used to decouple the roller 805 from the gear 806 in one direction of rotation to prevent buildup of unwanted forces in the tubing 201. The roller 805 is the component of each roller assembly 606 that contacts, and applies force to, drum assembly 154. The roller 805 may be constructed from metal, plastic, or composite materials. The rollers 805 may also be coated in materials used to reduce friction, including but not limited to Teflon. Further, the rollers 805 may be solid or hollow.

Figure 9:
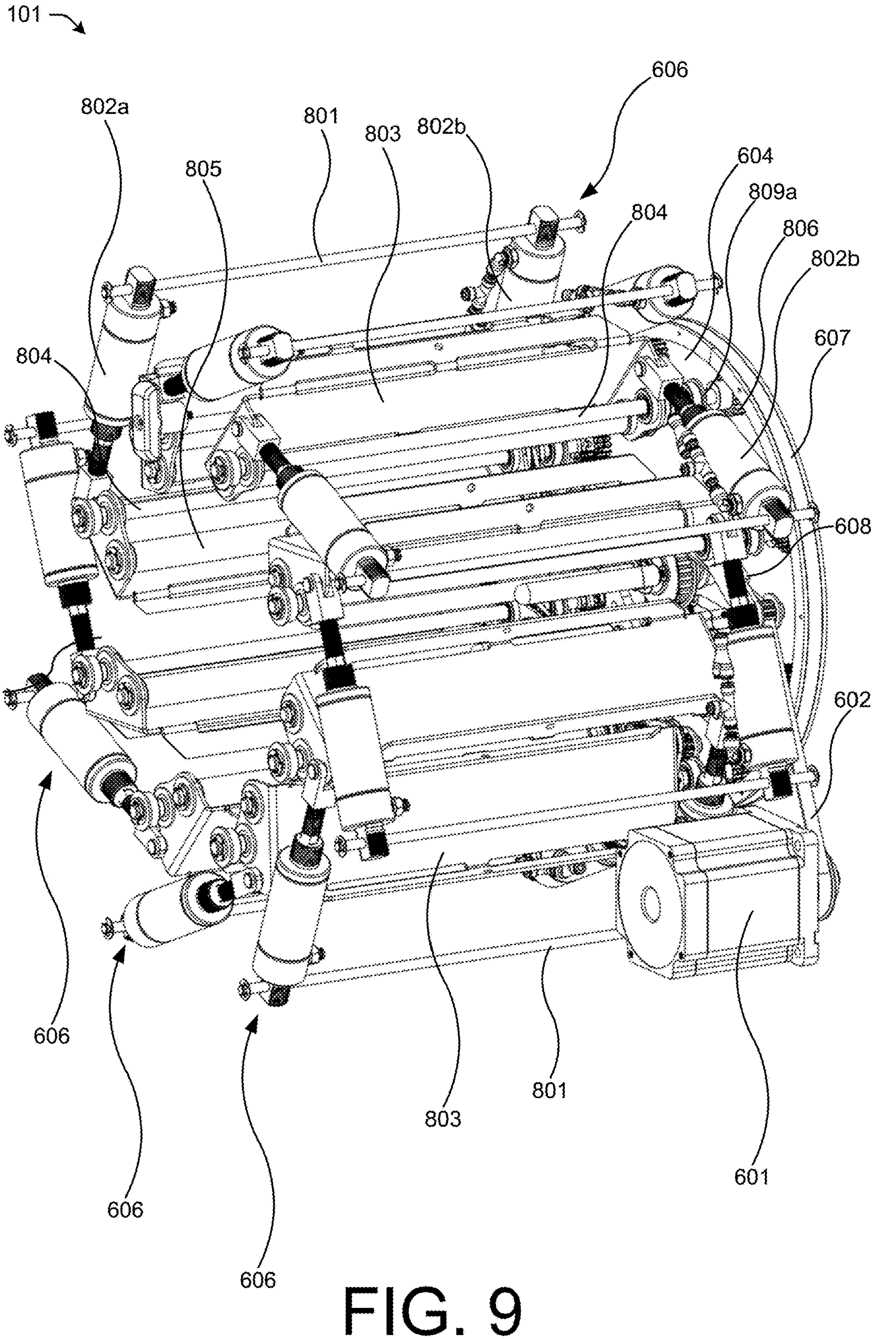
FIG. 9 illustrates the internal hardware of a reactor without a consumable installed, according to an example of the principles described herein.
Figure 10A:
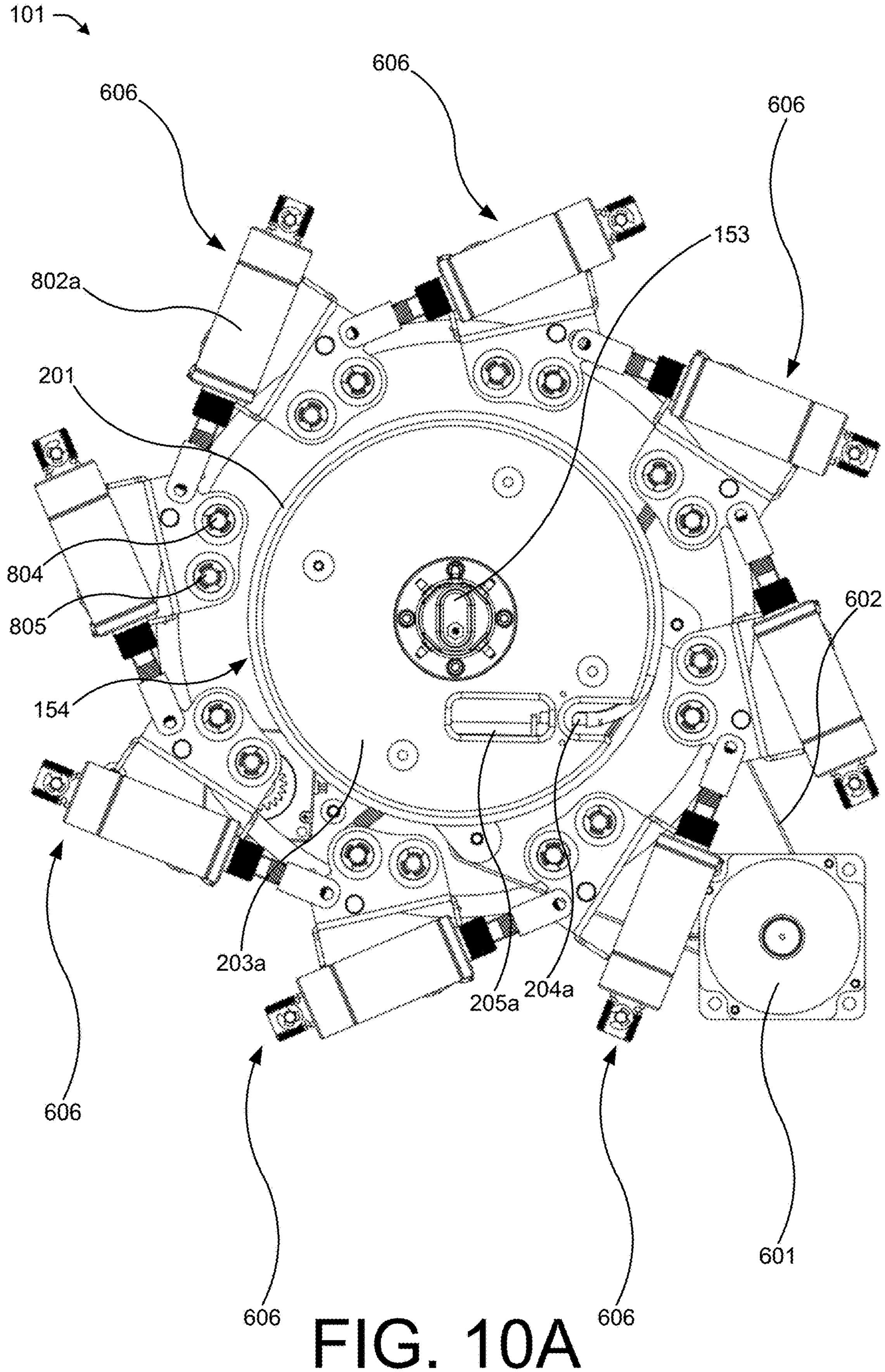
FIG. 10A illustrates a front view of a reactor in a disengaged position, where rollers do not contact a consumable installed therein, according to an example of the principles described herein.
Figure 10B:
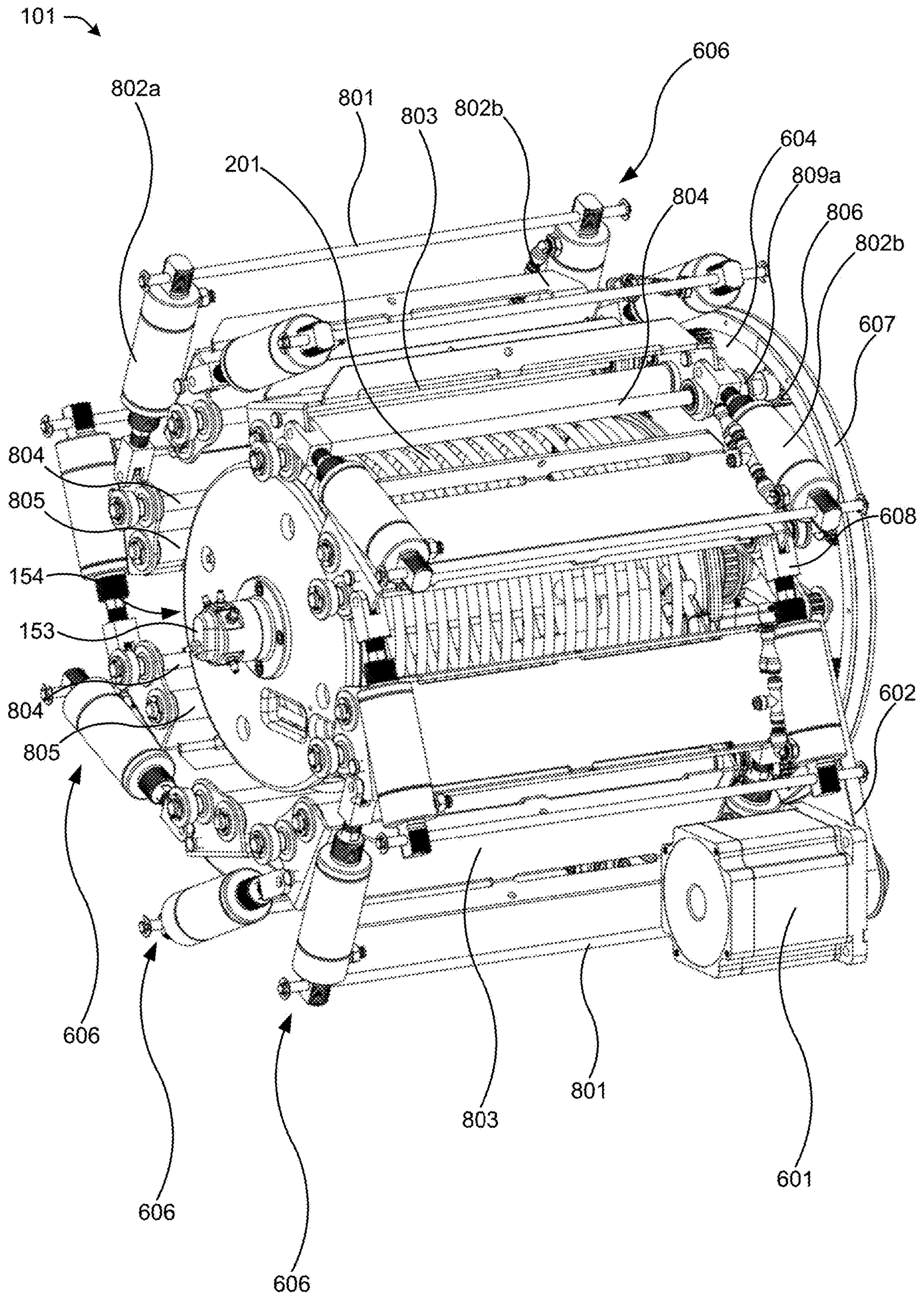
FIG. 10B illustrates an isometric view of a reactor in a disengaged position, where rollers do not contact a consumable installed therein, according to an example of the principles described herein.

FIG. 9 illustrates the internal hardware of the reactor 101 without the consumable 150 installed, according to an example of the principles described herein. More specifically, FIG. 9 depicts the roller assemblies 606 directly or indirectly coupled to the drum motor 601, the drum motor belt 602, the pulley 603, the consumable interface 604, the roller motor 605, the ring gear 607, and the motor balancing system 608, among other elements. FIG. 10A illustrates a front view of the reactor 101 in a disengaged position, where rollers do not contact the consumable 150 installed therein, according to an example of the principles described herein. FIG. 10B illustrates an isometric view of the reactor 101 in a disengaged position, where rollers do not contact a consumable 150 installed therein, according to an example of the principles described herein.

As depicted in FIGS. 10A and 10B, when roller assemblies 606 are in the disengaged position (e.g., the actuators 802 are retracted), the rollers 805 do not make physical contact with the drum assembly 154. The tubing 201 is uncompressed when the roller assemblies 606 are in the disengaged position.

Figure 11A:
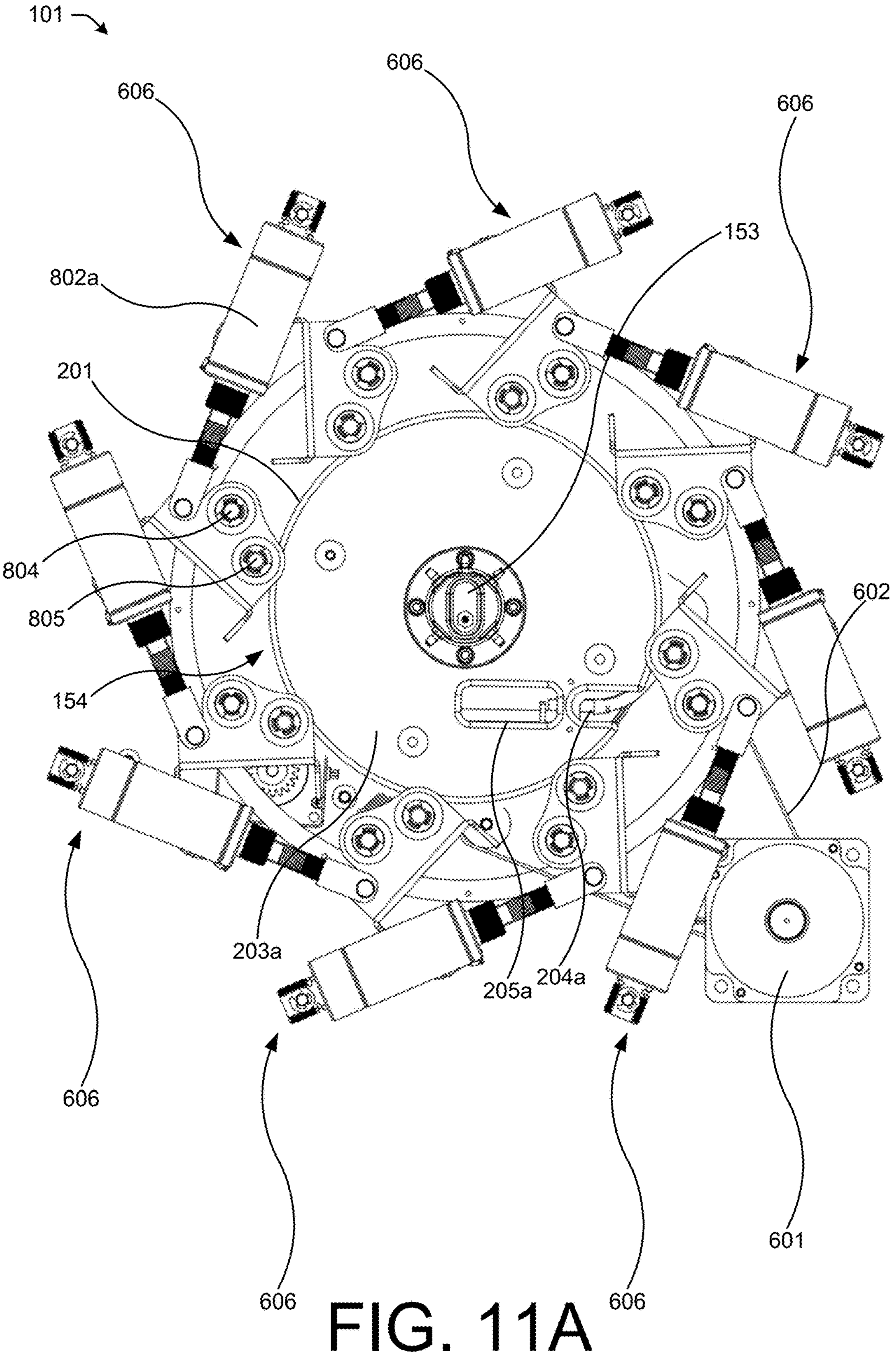
FIG. 11A illustrates a front view of a reactor in an engaged position, where rollers contact a consumable installed therein, according to an example of the principles described herein.
Figure 11B:
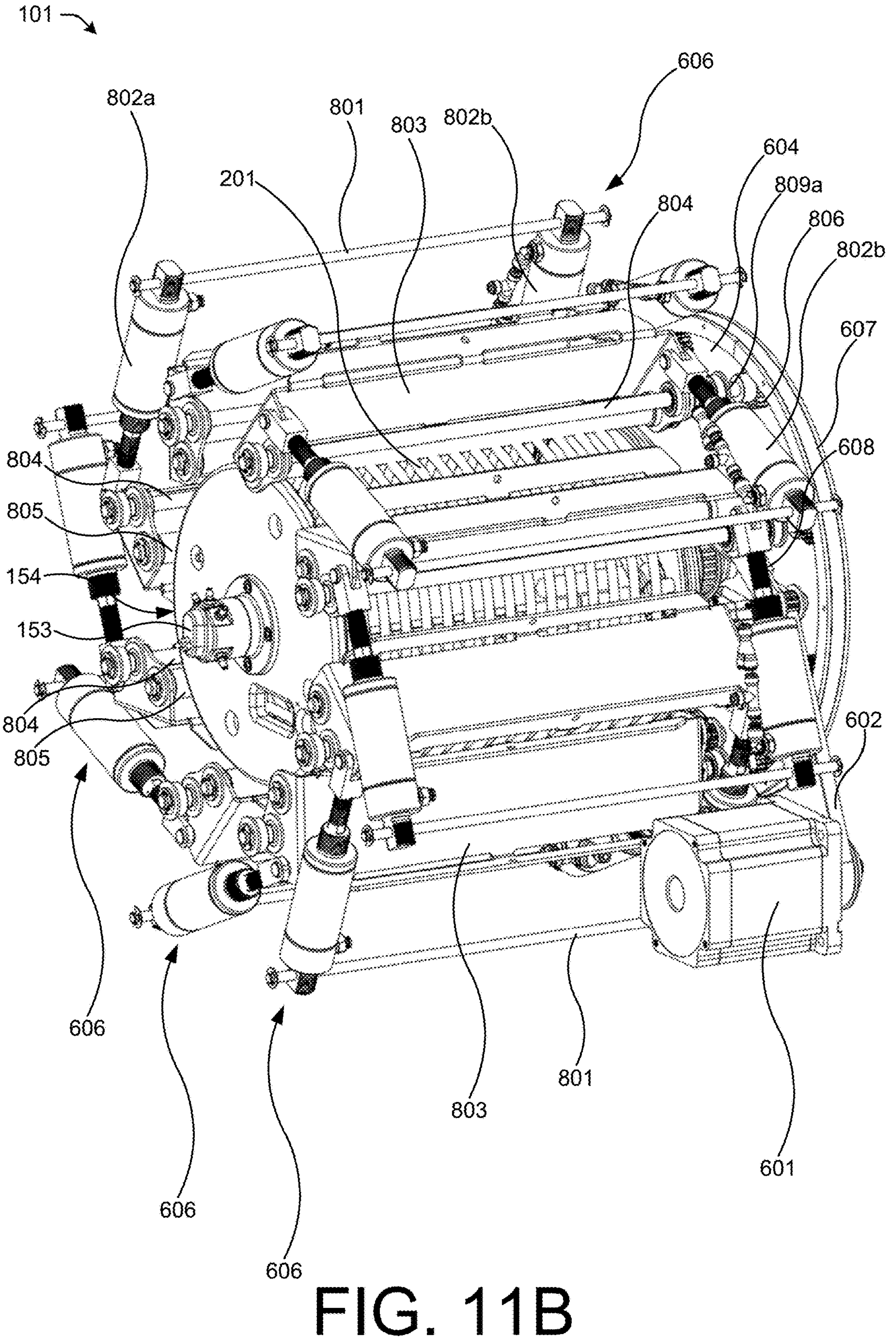
FIG. 11B illustrates an isometric view of a reactor in an engaged position, where rollers contact a consumable installed therein, according to an example of the principles described herein.

In contrast to FIGS. 9 through 10B, FIG. 11A illustrates a front view of the reactor 101 in an engaged position, where the rollers 805 contact the consumable 150 installed therein, according to an example of the principles described herein. Further, FIG. 11B illustrates an isometric view of the reactor 101 in an engaged position, where the rollers 805 contact the consumable 150 installed therein, according to an example of the principles described herein. As depicted in FIGS. 11A and 11B, when the roller assemblies 606 are in the engaged position (e.g., the actuators 802 are extended), the rollers 805 make physical contact with the drum assembly 154. The tubing 201 is compressed in the locations where the rollers 805 apply force. This action partitions the tubing 201 into many unique volumes. The number of isolated volumes of liquid in the tubing 201 is equal to the number of loops in the tubing 201 multiplied by the number of roller assemblies 606. For example, if six (6) roller assemblies 606 are used, and there are eighteen (18) loops in the tubing 201, there are [6×18=108] isolated volumes of fluid at any time.

When the roller assemblies 606 are in the engaged position (e.g., the actuators 802 are extended), as depicted in FIGS. 11A and 11B, the rollers 805 make physical contact with the drum assembly 154. By increasing the force applied by the actuators 802, the force applied by the rollers 805 to the drum assembly 154 may be increased. The force required may be dependent on the properties of the tubing 201, such as tubing inner and outer diameters, material durometer, and number or loops.

In one embodiment, the roller assemblies 606 may be individually activated to decrease the number of partitions or unique volumes. This individual activation of less than all the roller assemblies 606 may create a number of isolated volumes of liquid in the tubing 201 that is equal to the number of loops in the tubing 201 multiplied by the number of roller assemblies 606 just as in instances where all the roller assemblies 606 are activated. However, in instances where less than all of the roller assemblies 606 are activated (e.g., three (3) roller assemblies 606) and there are eighteen (18) loops in the tubing 201, there are [3×18=54] isolated volumes of fluid at any time.

Figure 12A:
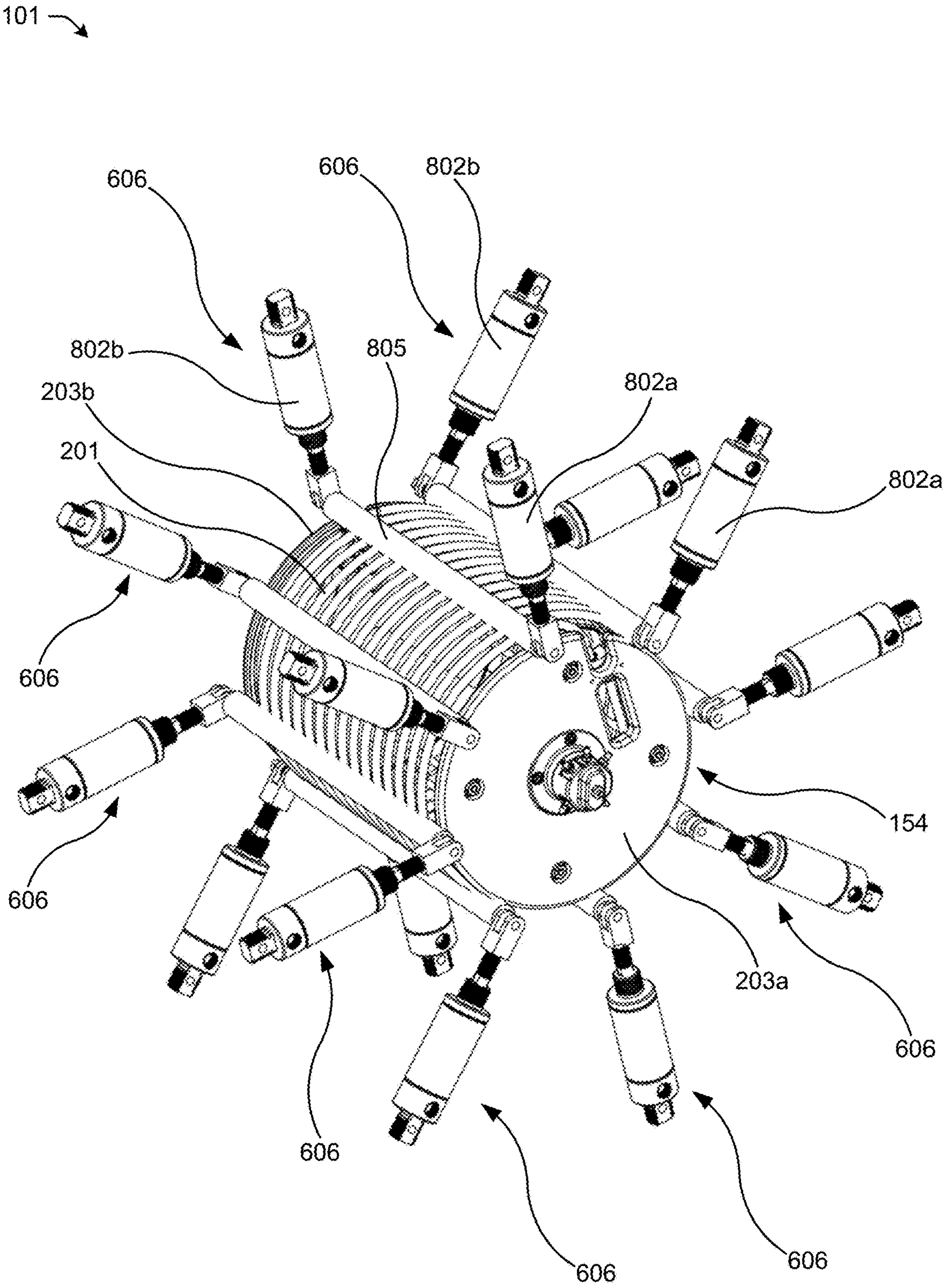
FIG. 12A illustrates an isometric view of a reactor in which roller assemblies are aligned radially, according to an example of the principles described herein.
Figure 12B:
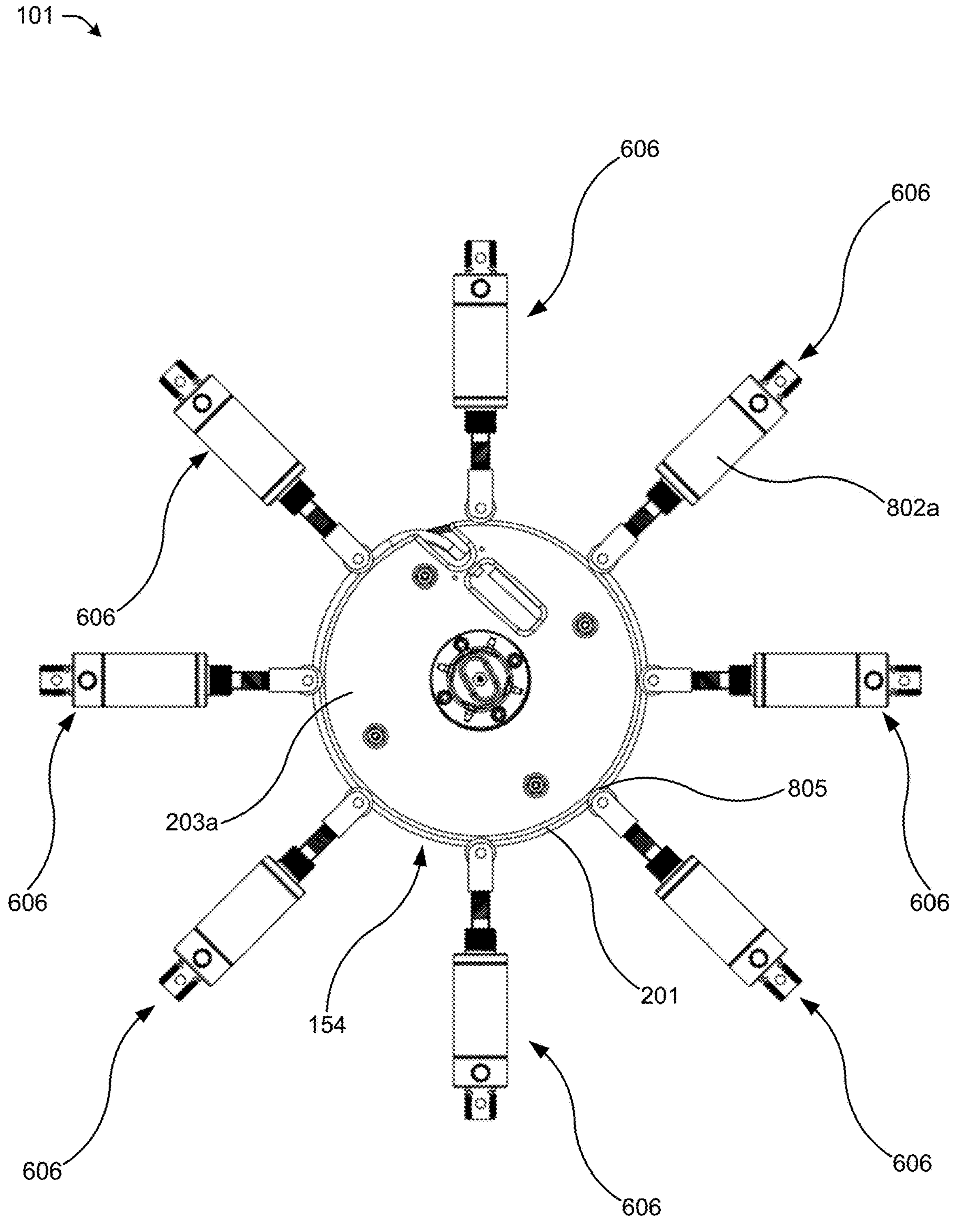
FIG. 12B illustrates a front view of a reactor in which roller assemblies are aligned radially, according to an example of the principles described herein.

One advantage of the design of the reactor system 100, as depicted in FIGS. 1 through 11B is a minimized physical size of the reactor 101. Thus, in the embodiments of FIGS. 1 through 11B, the roller assemblies 606 operate nearly tangential to drum assembly 154. In other embodiments where the size of the reactor 101 is not restricted, the roller assemblies 606 may take the form as depicted in FIGS. 12A and 12B. FIG. 12A illustrates an isometric view of a reactor 101 in which roller assemblies 606 are aligned radially, according to an example of the principles described herein. Further, FIG. 12B illustrates a front view of a reactor 101 in which roller assemblies 606 are aligned radially, according to an example of the principles described herein. As depicted in FIGS. 12A and 12B, each roller assembly 606 may be aligned radially with the drum assembly 154. In this embodiment, the body 803 of the roller assemblies 606 may be omitted as forces from the actuators 802 are directly applied to drum assembly 154 at, for example, an approximately 90-degree angle with respect to the surface of the drum assembly 154 and the tubing 201.

Figure 13A:
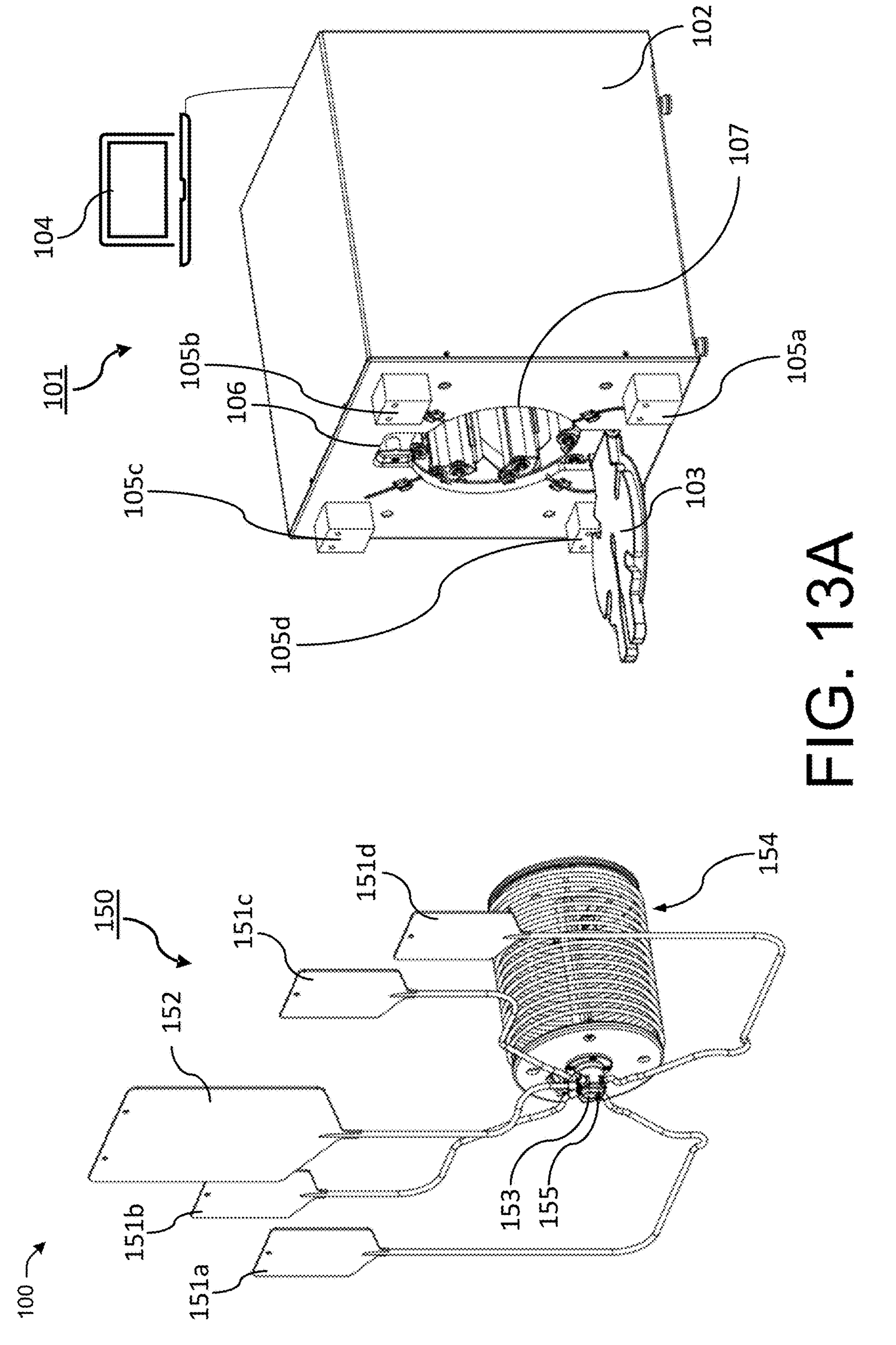
FIG. 13A illustrates an isometric view of a reactor system with an aligned but uninstalled consumable, according to an example of the principles described herein.
Figure 13B:
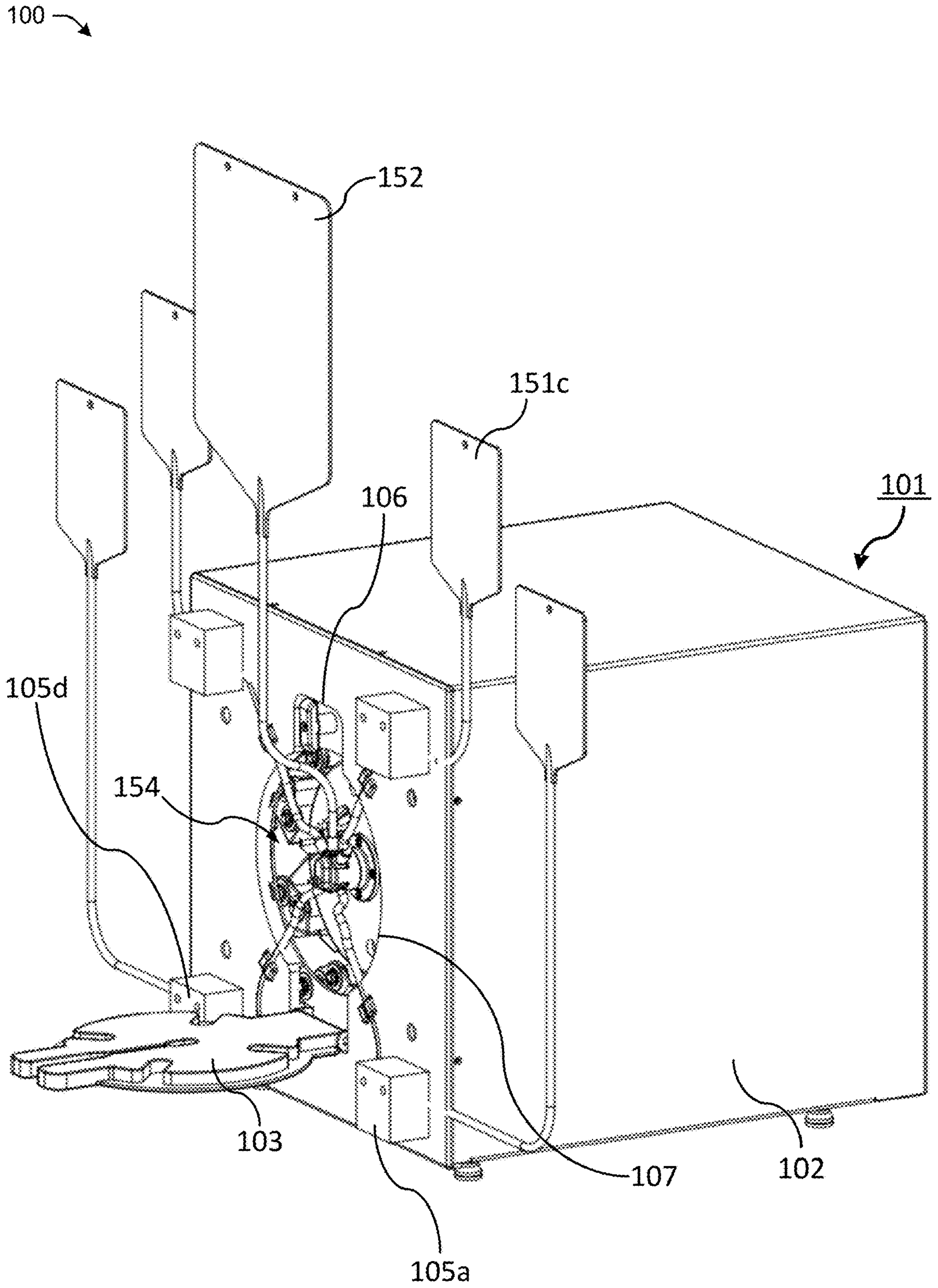
FIG. 13B illustrates an isometric view of a reactor system with an aligned and installed consumable, according to an example of the principles described herein.
Figure 13C:
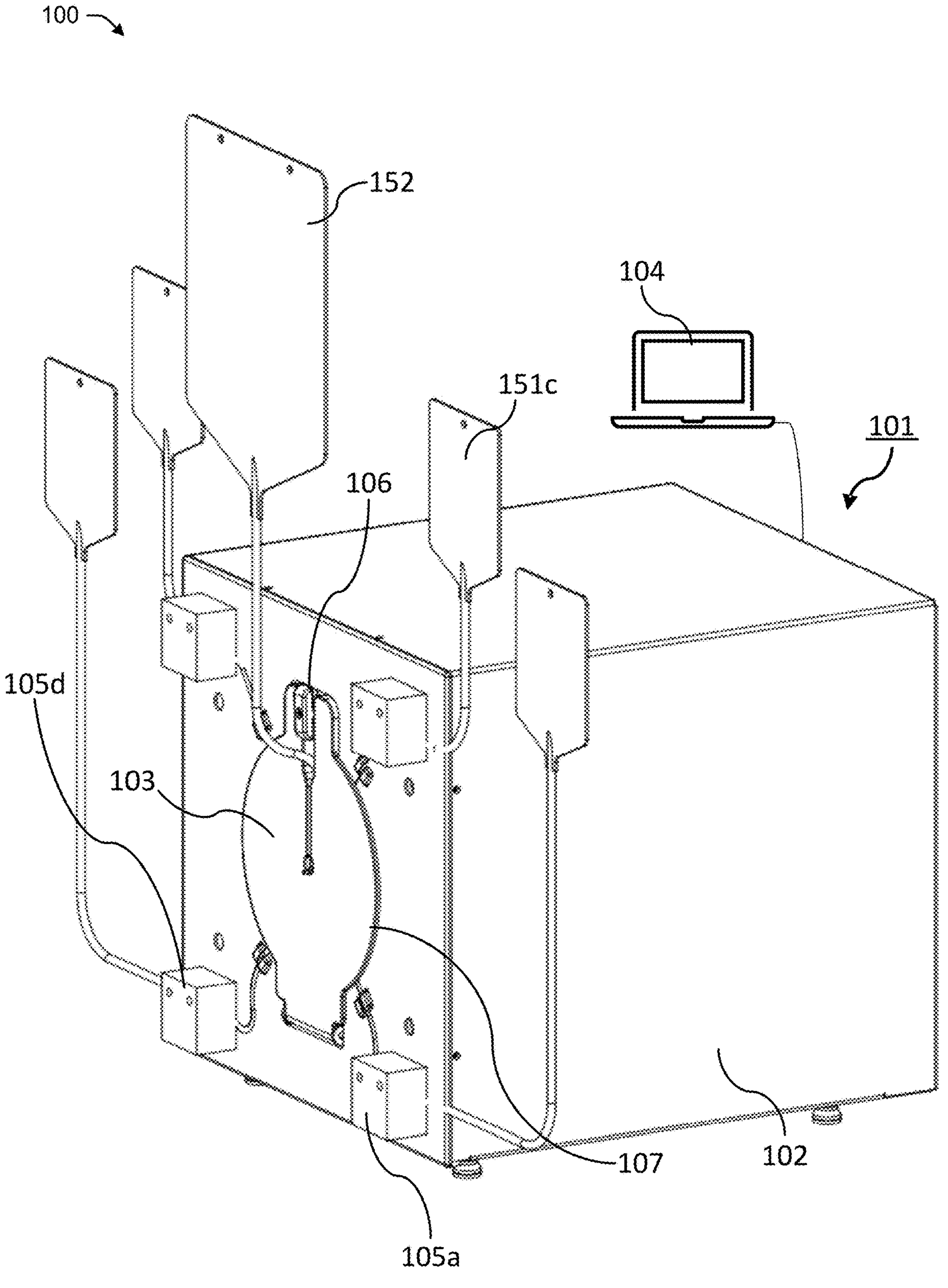
FIG. 13C illustrates an isometric view of a reactor system with an aligned and installed consumable with a reactor door closed, according to an example of the principles described herein.

FIG. 13A illustrates an isometric view of the reactor system 100 with an aligned but uninstalled consumable 150, according to an example of the principles described herein. FIG. 13B illustrates an isometric view of the reactor system 100 with an aligned and installed consumable 150, according to an example of the principles described herein. FIG. 13C illustrates an isometric view of the reactor system 100 with an aligned and installed consumable 150 with a reactor door 103 closed, according to an example of the principles described herein. FIG. 14 illustrates example parameters a user may enter into a computing device 104 of the reactor system 100, according to an example of the principles described herein. An example on how a user may operate the reactor 101 and the consumable 150 of the reactor system 100 is depicted in FIGS. 13A through 14. The user may perform the following actions in sequence or alter the sequence as needed to fit an application. As depicted in FIGS. 13A, the user may prepare the reactor 101 to receive the consumable 150 by opening the reactor door 103, thus exposing the reactor opening 107. The user may prepare the consumable 150 prior to installation into the reactor 101 by filling all input reagent vessels 151, filling the bulk reagent vessel 152, performing applicable aseptic connections, performing applicable sterile tube welds, and/or closing any manual pinch clamps to prevent unwanted fluid movement within the consumable 150.

When the consumable 150 is ready to be installed into the reactor 101, the user may maintain approximate axial alignment of drum assembly 154 with the reactor opening 107 until the end plate 203*b* of the drum assembly 154 contacts the consumable interface 604 and engages with the consumable interface 604 to allow for the drum assembly 154 of the consumable 150 to be rotated as the consumable interface 604 is rotated by the reactor 101. Upon completion of this step, the user may route tubing through any tube routing features, tube guides, sensors, or pumps 105. When this step is complete, the reactor 101 and the consumable 150 may appear as depicted in FIG. 13B. It may be noted that in FIGS. 13A through 13C, there is no outlet tubing connected to rotary seal 153 of the outlet 155 of the drum assembly 154. In one embodiment, this tubing may exist and be connected to equipment downstream of the reactor 101. Lastly, the user may close the reactor door 103 so the system resembles the depiction in FIG. 13C.

Now that the consumable 150 has been successfully installed in the reactor 101, the user may use the computing device 104 to load a protocol via which the reactor 101 will process the fluids introduced into the consumable 150. An example protocol is depicted in FIG. 14. In this example, the user may enter the number of inputs including five (5) different ingredients and the respective percent (%) by volume of those ingredients. The ingredients may include, for example, all input reagent vessels 151 and the bulk reagent vessel 152. The user may further enter a desired formulation in units of percentage by volume. For example, in FIG. 14, the user has entered a formulation with five reagents and the percentages must, and do, add up to 100%. The user has also entered a temperature (e.g., 37 C) and reaction time, and/or a residence time (e.g., 4 hours, 13 minutes, 30 seconds).

Next, the reactor 101 may scan the QR code included on the consumable 150 to determine the characteristics of the tubing 201 or any information regarding the drum assembly 154 and its constituent parts. Using this information, the reactor 101 may calculate how much force the actuators 802 may apply to the tubing 201 to sufficiency compress every loop of the tubing 201. The reactor 101 may further initiate a priming sequence to bring all input liquids to a common fluidic junction within the rotary seal 153. In one embodiment, the input reagent vessels 151 may prime using the pumps 105.

The roller assemblies 606 may engage with the drum assembly 154 to create a helical peristaltic pump as the rollers 805 compress the tubing 201. Once engaged, the drum motor 601 may begin rotating the drum assembly 154, while the roller motor 605 begins rotating the rollers 805. As the drum assembly 154 rotates, negative pressure is created within the tubing 201 and the bulk reagent within the bulk reagent vessel 152 is drawn towards the rotary seal 153. When the bulk reagent within the bulk reagent vessel 152 reaches the common fluidic junction within the rotary seal 153, the system may be considered as fully primed. Fluid detection sensors may be used during these priming steps.

The reactor 101 may rotate the drum assembly 154 at a rotational velocity such that it takes 4 hours, 13 minutes, and 30 seconds, for each isolated volume of liquid to traverse the tubing 201. Every drop of reacted product that exits the consumable 150 through the outlet 155 will have been isolated, and reacted, for the same amount of time and under the same temperature and lighting conditions. A high-level fluidic schematic of this example is depicted in FIG. 15.

Figure 15:
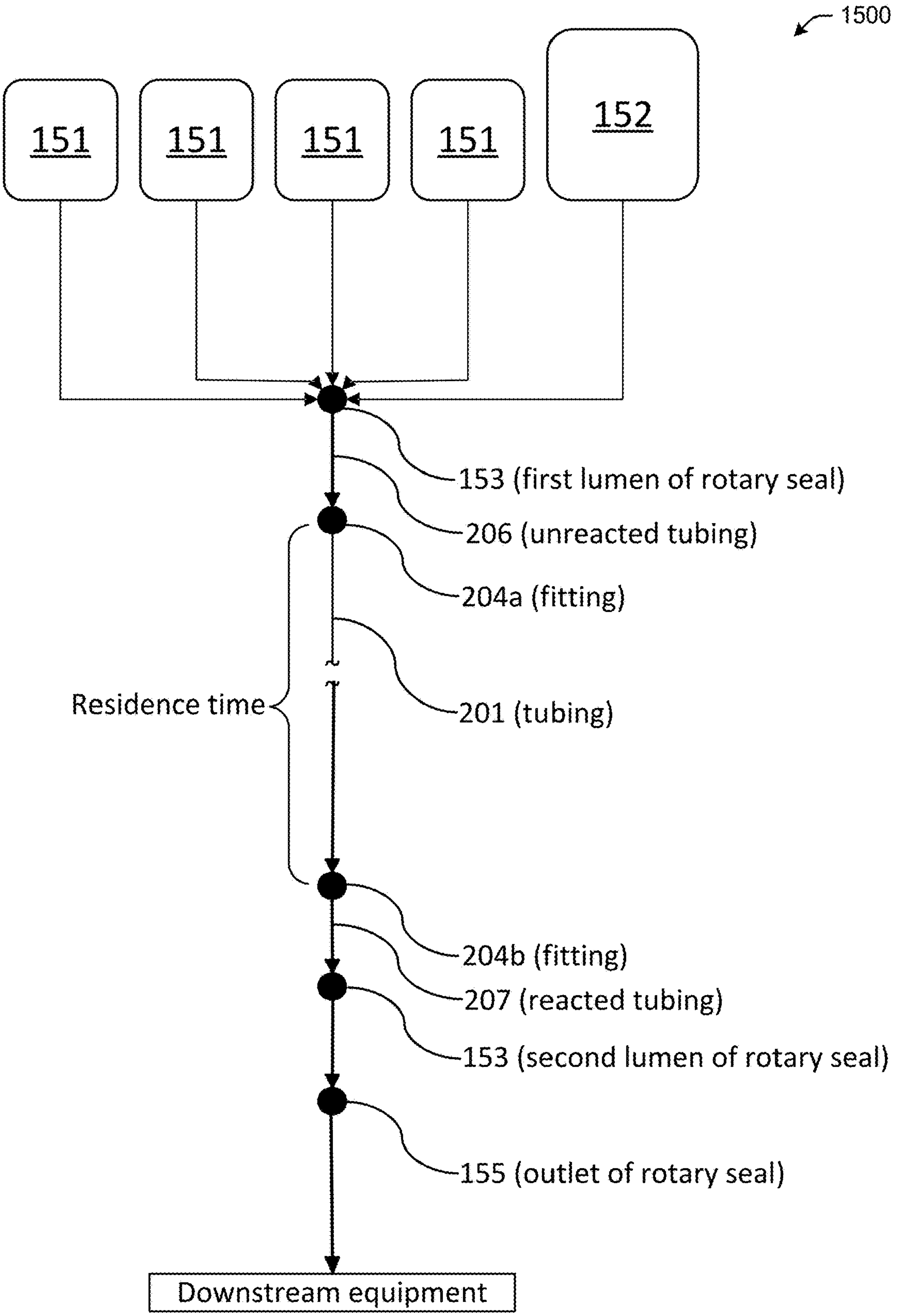
FIG. 15 illustrates a high-level fluidic schematic of a reactor system and a protocol of the reactor, according to an example of the principles described herein.

FIG. 15 illustrates a high-level fluidic schematic 1500 of a reactor system 100 and a protocol of the reactor 101, according to an example of the principles described herein. The fluidic schematic 1500 of FIG. 15 may include the input reagent vessels 151 and the bulk reagent within the bulk reagent vessel 152 fluidically coupled to the rotary seal 153. In one embodiment, the input reagent vessels 151 and the bulk reagent within the bulk reagent vessel 152 may be coupled to a first lumen of the rotary seal 153 that serves as an input to the rotary seal 153. As described herein, the rotary seal 153 may include a plurality of inlets 156. The plurality of inlets 156 may serve as inlets to the first lumen through which the input reagents or liquids may be injected into the drum assembly 154 of the consumable 150. The unreacted tubing 206 may be coupled between the rotary seal 153 and the fitting 204*a*. The tubing 201 may be coupled to the fitting 204*a* and the fitting 204*b* with the residence time being defined at least in part on the length of the tubing 201.

The fitting 204*b* may be coupled to the reacted tubing 207 and the second lumen and the outlet 155 of the rotary seal 153 through which the liquid may exit the consumable 150. As depicted in FIG. 15, the output of the consumable may be directed to downstream equipment such as bioreactor, a fill-and-finish machine, a liquid handling station, an additional reactor 101, or other downstream equipment.

Figure 16:
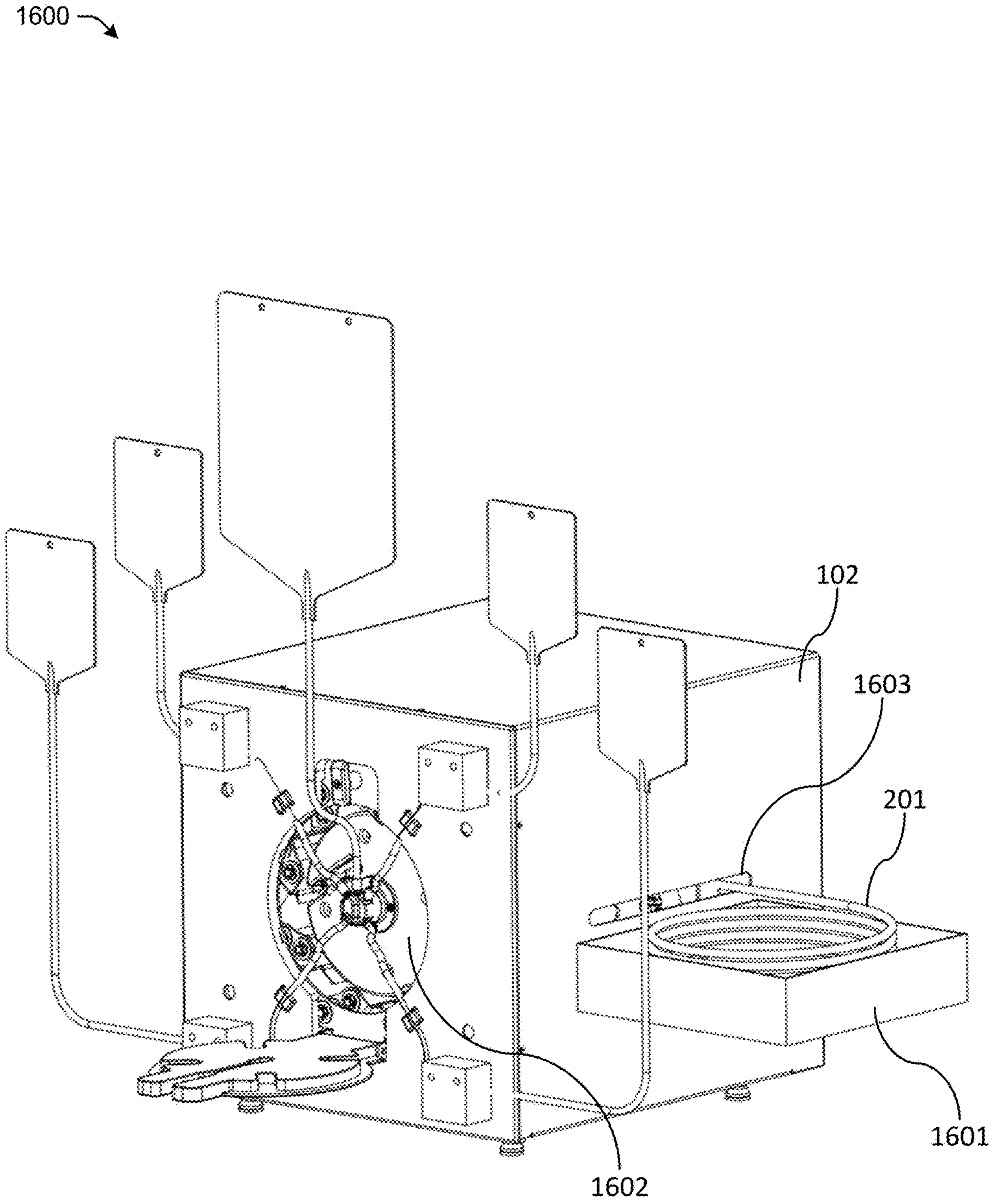
FIG. 16 illustrates a reactor system in which tubing may be installed within the reactor system prior to operation of the reactor system, according to an example of the principles described herein.

Previous descriptions and depictions of the drum assembly 154 depict a pre-wrapped or pre-installed tubing 201. FIG. 16 illustrates a reactor system 1600 in which tubing 201 may be installed within the reactor system 1600 prior to operation of the reactor system, according to an example of the principles described herein. In one embodiment, however, it may be beneficial to install the tubing 201 just before use. As depicted in FIG. 16, reactor system 1600 may be designed with an integrated, non-removable drum 1602, similar in functionality to drum 202. In this embodiment, a container 1601, which contains the tubing 201, may be installed onto the side or top of reactor system 1600. To install the tubing 201 around drum 1602, the tubing 201 may be fed through slot 1603 and secured to the drum 1602. As the drum 1602 rotates, an internal tube guide controls the pitch and preload of the tubing as it is wrapped around the drum 1602. The trailing end of the tubing 201 may then be connected to the appropriate fitting through an access panel in the enclosure 102.

Conclusion

The examples described herein provide a fluid isolating peristaltic pump including a reactor and a consumable for use within the reactor. The reactor includes roller assemblies that assist in the creation of isolated volumes within a processing tubing wrapped around an outside of the consumable as the consumable is rotated within the reactor via a drum motor. The consumable includes a rotary seal that allows for the consumable to be rotated within the reactor by the roller assemblies while still providing reactants to the tubing wrapped around the outside of the consumable.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A reactor system comprising:
- a reactor including:
  - a drum motor,
  - a roller assembly including a roller,
  - a roller motor mechanically coupled to the roller assembly,
  - a ring gear mechanically coupled to the roller motor, and
  - a motor balancing system to preload tension into a drum motor belt coupled to the drum motor to synchronize the drum motor and the roller motor; and
- a consumable that is insertable into the reactor.

2. The reactor system of claim 1, wherein the motor balancing system includes:
- a drum motor belt coupled to the drum motor;
- an arm coupled to the drum motor belt; and
- a spring coupled to the arm, the spring applying a tension force to the drum motor belt.

3. The reactor system of claim 2, further comprising:
- a consumable interface coupled to the drum motor belt and driven by the drum motor,
- wherein the consumable includes an end plate selectively engageable with the consumable interface such that, when engaged, the consumable rotates as the consumable interface rotates.

4. The reactor system of claim 1, wherein:
- the roller assembly further includes:
  - a body,
  - a shaft coupled to the body along a first longitudinal axis, and
  - a gear mechanically coupled to the shaft and the ring gear,
- the roller is coupled to the body along a second longitudinal axis,
- a roller belt is coupled between the shaft and the roller to transfer rotational force from the shaft to the roller, and
- an actuator is coupled to the body along a third longitudinal axis, the actuator being configured to selectively position the roller against the consumable.

5. The reactor system of claim 1, wherein the consumable includes:
- a first end plate;
- a second end plate coupled to the first end plate via a tensioner; and
- a rotary seal coupled to the first end plate, the rotary seal including:
  - a first subassembly,
  - a second subassembly rotatable with respect to the first subassembly,
  - an input lumen defined in the first subassembly, and
  - an output lumen defined in the first subassembly, and
- wherein the first subassembly and the second subassembly are hermetically sealed from an environment exterior to the consumable.

6. The reactor system of claim 5, wherein the consumable further includes:
- a first tubing fluidically coupled to the input lumen of the rotary seal;
- a first fitting fluidically coupled to the first tubing;
- a second tubing fluidically coupled to the first fitting;
- a second fitting fluidically coupled to the second tubing; and
- a third tubing fluidically coupled to the second fitting and the output lumen of the rotary seal.

7. The reactor system of claim 6, wherein the consumable further includes:
- an input reagent vessel fluidically coupled to the input lumen; and
- a bulk reagent vessel fluidically coupled to the input lumen.

8. The reactor system of claim 1, further comprising a computing device communicatively coupled to control and monitor the reactor.

9. A reactor system comprising:
- a reactor including:
  - a drum motor,
  - a roller assembly including:
    - a roller, and
    - an actuator configured to selectively position the roller,
  - a roller motor mechanically coupled to the roller assembly,
  - a coupling mechanism to transfer rotational force from the roller motor to the roller assembly,
  - a motor balancing system to preload tension into a drum motor belt coupled to the drum motor to synchronize the drum motor and the roller motor, and
  - an enclosure configured to regulate at least one of temperature or light within the reactor; and
- a consumable that is insertable into the reactor, the consumable including a tubing wrapped around a drum.

10. The reactor system of claim 9, wherein the motor balancing system includes:
- a drum motor belt coupled to the drum motor;
- an arm coupled to the drum motor belt; and a spring coupled to the arm, the spring applying a tension force to the drum motor belt.

11. The reactor system of claim 9, wherein the roller assembly includes a plurality of roller assemblies and a plurality of actuators, and wherein the plurality of actuators of the plurality of roller assemblies are individually actuatable based at least in part on a protocol.

12. The reactor system of claim 9, wherein the reactor further includes a thermal controller configured to regulate an internal temperature of the reactor.

13. The reactor system of claim 9, wherein the reactor further includes a pneumatic controller configured to control pneumatic components of the reactor.

14. The reactor system of claim 9, further comprising a pump to move reactants into the consumable, wherein the pump includes one or more of a peristaltic pump, a syringe pump, a gear pump, or a diaphragm pump.

15. The reactor system of claim 9, wherein the roller assembly is configured to compress the tubing to partition the tubing into a plurality of isolated volumes.

16. A reactor system comprising:

a reactor including:

a drum motor, a consumable interface driven by the drum motor, a roller assembly including a roller and an actuator, a roller motor mechanically coupled to the roller assembly, and a motor balancing system to preload tension into a drum motor belt coupled to the drum motor to synchronize the drum motor and the roller motor; and a consumable that is insertable into the reactor and selectively engageable with the consumable interface such that when engaged, the consumable rotates as the consumable interface rotates, wherein the consumable includes a rotary seal.

17. The reactor system of claim 16, wherein the rotary seal includes:

a first subassembly, a second subassembly rotatable with respect to the first subassembly, an input lumen defined in the first subassembly, and an output lumen defined in the first subassembly, and wherein the first subassembly and the second subassembly are hermetically sealed from an environment exterior to the consumable.

18. The reactor system of claim 17, wherein the consumable further includes a static mixer disposed within a tubing fluidically coupled to the input lumen of the rotary seal.

19. The reactor system of claim 16, wherein the consumable includes a label readable by the reactor to set operational parameters of the reactor.

20. The reactor system of claim 16, wherein the actuator includes pneumatic cylinders or hydraulic cylinders.

* * * * *